United States Patent
Nakajima et al.

(10) Patent No.: US 6,234,003 B1
(45) Date of Patent: *May 22, 2001

(54) METHOD OF JUDGING THE LIP TURNOVER OF A SEAL AND APPARATUS FOR INSERTING A SEAL

(75) Inventors: Mitsuru Nakajima, Atsugi; Kenji Kobayashi, Aikoh-gun; Motoi Hiramatsu, Sagamihara, all of (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/439,291

(22) Filed: Nov. 15, 1999

Related U.S. Application Data

(63) Continuation of application No. 08/991,306, filed on Dec. 16, 1997, now Pat. No. 6,053,029.

(30) Foreign Application Priority Data

| Dec. 16, 1996 | (JP) | 8-353704 |
| Jun. 5, 1997 | (JP) | 9-165245 |
| Dec. 9, 1997 | (JP) | 9-339116 |
| Dec. 9, 1997 | (JP) | 9-339121 |

(51) Int. Cl.[7] .................................................. G01N 19/02
(52) U.S. Cl. ............................................................... 73/9
(58) Field of Search ............................ 73/9, 10, 760, 73/862.338, 862.339

(56) References Cited

U.S. PATENT DOCUMENTS

| 3,176,497 | * | 4/1965 | Dega ............................................. 73/9 |
| 3,313,141 | * | 4/1967 | Jagger et al. ................................ 73/9 |
| 4,817,255 | * | 4/1989 | Shaw, Jr. ................................ 29/33 R |
| 5,038,601 | * | 8/1991 | Renneker ..................................... 73/9 |
| 5,410,920 | * | 5/1995 | Westwick ............................. 73/866.5 |
| 5,814,717 | * | 9/1998 | Antonini et al. ............................ 73/9 |

* cited by examiner

*Primary Examiner*—Max Noori
(74) *Attorney, Agent, or Firm*—Oblon, Spivak, McClelland, Maier & Neustadt, P.C.

(57) ABSTRACT

When a seal is inserted onto a shaft, load applied to a chuck is detected by a load cell, and based on the detected load, the turnover of a lip is judged. More specifically, an operation of inserting and pulling out the seal is performed several times on the shaft. Pull-out force is detected at the time of the last pull-out operation and insertion force is detected at the time of the last insertion operation. If the detected value is greater than a predetermined value, it is judged that the lip has been turned over. Also, a ratio between the aforementioned pull-out force and insertion force is computed. If the value of the computed ratio is less than a predetermined value, it is judged that the lip has been turned over.

73 Claims, 26 Drawing Sheets

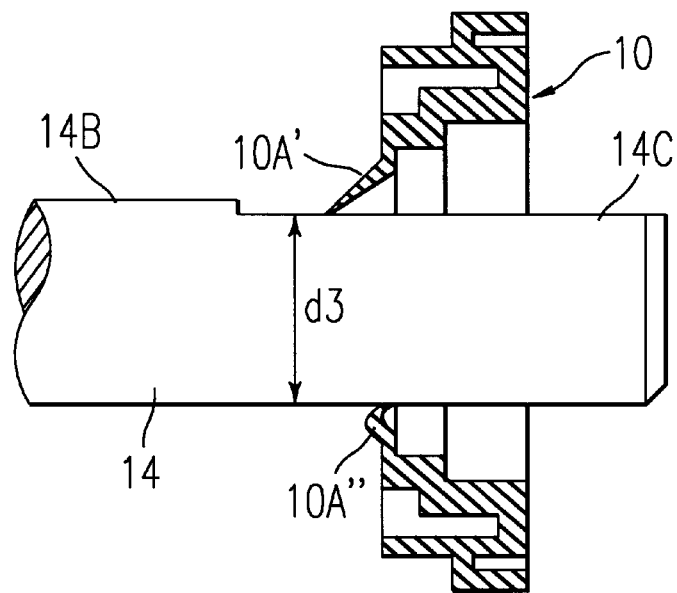
FIG. 22
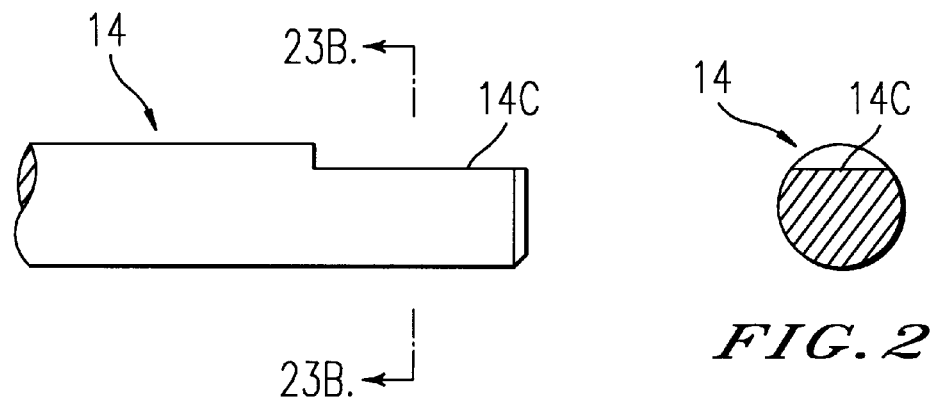
FIG. 23A
FIG. 23B

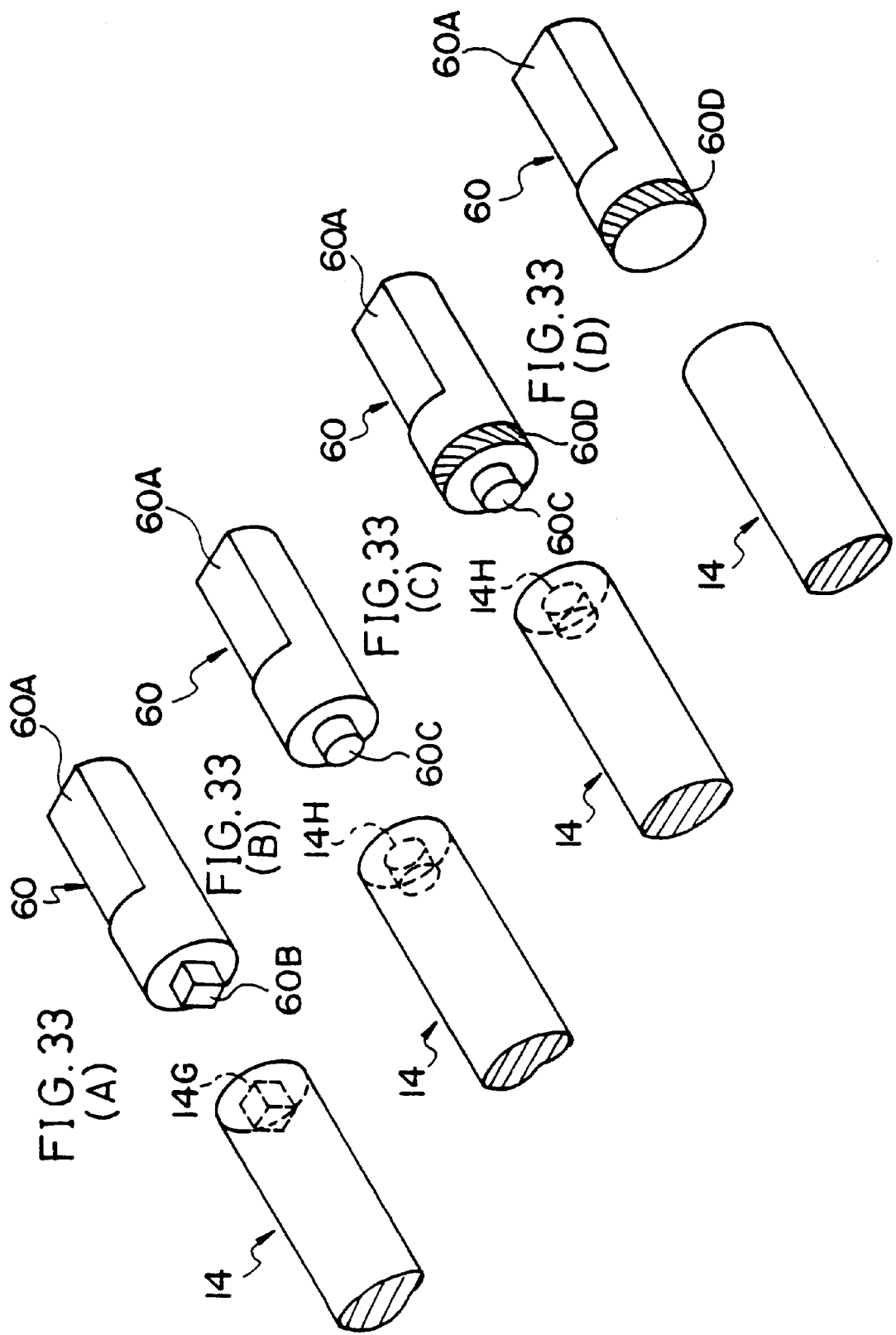

METHOD OF JUDGING THE LIP TURNOVER OF A SEAL AND APPARATUS FOR INSERTING A SEAL

This application is a continuation of Ser. No. 09/991,306 filed Dec. 16, 1997; now U.S. Pat. No. 6,053,029.

BACKGROUND OF THE INVENTION

1. Field of the Invention

The present invention relates to a method of judging the lip turnover of a seal having a lip, such as an oil seal or G seal with a lip, in inserting the seal onto a shaft, and an apparatus for inserting such a seal.

2. Description of the Related Art

In seals with a lip, the point portion of the lip consisting of an elastic member, such as rubber, makes close contact with a shaft to form a seal portion and prevents leakage of oil and invasion of foreign matter, such as dust, with the seal portion. When such a seal with a lip is fitted on a shaft, the direction of the lip must be directed in a direction in which the seal is inserted onto the shaft.

However, there are cases where at the time of insertion the lip of the seal is turned over due to friction between it and the shaft and is directed in a direction opposite the insertion direction. If the lip is turned over in this way, a gap will be developed between the seal portion and the shaft and a situation such as leakage of oil and invasion of dust will take place.

For example, in Japan Utility Model No. 3007446 (Japan Utility Model Application No. HEI 6-10536), it has been proposed to provide a cutout in the outer circumferential edge to easily detect by an air leakage test whether or not the lip has been turned over.

The air leakage test, however, requires an air supply unit, piping for passing air from the air supply unit to a chuck hand for clamping a seal, and an expensive sensor for detecting air leakage. Furthermore, an exclusive chuck hand for leakage detection is required. Thus, providing large-scale equipment solely for the purpose of detecting the turnover of a seal is not only disadvantageous in costs, but it also takes time to detect air leakage. Furthermore, the production efficiency is reduced.

SUMMARY OF THE INVENTION

It is an object of the present invention to provide a turnover judgment method and a seal insertion apparatus which are capable of judging with simple equipment whether or not the lip of a seal has been turned over in inserting the seal onto a shaft.

To achieve this end, the invention as set forth in a first aspect is constituted by a turnover judgment method comprising the steps of: inserting a seal with a lip onto a shaft; detecting insertion force of the seal; and judging turnover of the lip, based on a result of the detection.

According to the invention as set forth in the first aspect, the turnover of the lip is judged based on the insertion force of the seal. Therefore, the turnover of the lip can be judged without providing large-scale equipment. Also, when the lip is turned over, the turnover can be immediately detected and a measure to counter the turnover can be quickly taken. As a consequence, the time for inserting the seal onto the shaft can be shortened.

The invention as set forth in a second aspect is constituted by a turnover judgment method comprising the steps of: (a) performing once or a plurality of times at a time a first operation in which a seal with a lip is inserted once onto a shaft at a first predetermined position, a second operation in which the seal is pulled out from the first predetermined position to a second predetermined position at which the seal does not slip out of the shaft, and a third operation in which the seal is again inserted on the shaft from the second predetermined position; (b) detecting insertion force applied during the first operation; and (c) judging turnover of the lip, based on a result of the detection.

According to the invention as set forth in the second aspect, the turnover of the lip is judged based on the insertion force applied during the first operation. Therefore, when the lip is turned over, the turnover can be immediately detected.

In the invention as set forth in a third aspect, when the seal is inserted on the shaft in the same procedure as the aforementioned, the pull-out force applied during the second operation is detected and the turnover of the lip is judged based on a result of the detection.

According to the invention as set forth in the third aspect, the turnover of the lip is judged based on the insertion force applied during the second operation. Therefore, with the state in which the seal is adapted to the shaft as compared with the first operation, the pull-out force is detected and the turnover of the lip can be judged with a high degree of accuracy.

In the invention as set forth in a fourth aspect, when the seal is inserted on the shaft in the same procedure as the aforementioned, the insertion force applied during the second operation is detected and the turnover of the lip is judged based on a result of the detection.

According to the invention as set forth in the fourth aspect, the turnover of the lip is judged based on the insertion force applied during the third operation. Therefore, with the state in which the seal is further adapted to the shaft as compared with the second operation, the insertion force is detected and the turnover of the lip can be judged with an even higher degree of accuracy.

In the invention as set forth in a sixth aspect, when the seal is inserted on the shaft in the same procedure as the aforementioned, the insertion force applied during the first operation is detected and the pull-out force applied during the second operation is detected. The ratio between the detected insertion force and the detected pull-out force is computed, and the turnover of the lip is judged based on the value of the computed ratio.

According to the invention as set forth in the sixth aspect, the turnover of the lip is judged based on the ratio between the insertion force during the first operation and the pull-out force during the second operation. Therefore, even when external noise gets into the detected value of the insertion force or pull-out force, the noise component is easily canceled and the turnover of the lip can be judged with a high degree of accuracy.

In the invention as set forth in a seventh aspect, when the seal is inserted on the shaft in the same procedure as the aforementioned, the insertion force applied during the first operation is detected and the insertion force applied during the third operation is detected. The ratio between the detected two insertion forces is computed, and the turnover of the lip is judged based on the value of the computed ratio.

According to the invention as set forth in the seventh aspect, the turnover of the lip is judged based on the ratio between the insertion force during the first operation and the insertion force during the third operation. Therefore, even when external noise gets into the detected values of the two insertion forces, the noise component is easily canceled and the turnover of the lip can be judged with a high degree of accuracy.

In the invention as set forth in a ninth aspect, when the seal is inserted on the shaft in the same procedure as the aforementioned, the pull-out force applied during the second operation is detected after a fixed time has elapsed since a start of the second operation, and the turnover of the lip is judged based on a result of the detection.

According to the invention as set forth in the ninth aspect, the pull-out force applied during the second operation is detected after a fixed time has elapsed since a start of the second operation. Therefore, the pull-out force is detected after the pull-out operation has been stabilized. Even when external noise gets into the detected value of the pull-out force, the noise component is easily canceled and the turnover of the lip can be judged with a high degree of accuracy.

In the invention as set forth in a tenth aspect, when the seal is inserted on the shaft in the same procedure as the aforementioned, the insertion force applied during the third operation is detected after a fixed time has elapsed since a start of the third operation, and the turnover of the lip is judged based on a result of the detection.

According to the invention as set forth in the tenth aspect, the insertion force applied during the third operation is detected after a fixed time has elapsed since a start of the third operation. Therefore, the insertion force is detected after the pull-out operation has been stabilized. Even when external noise gets into the detected value of the insertion force, the noise component is easily canceled and the turnover of the lip can be judged with a high degree of accuracy.

In the invention as set forth in a twelfth aspect, when the seal is inserted on the shaft in the same procedure as the aforementioned, the insertion force applied during the first operation is detected after a fixed time has elapsed since a start of the first operation. Also, the pull-out force applied during the second operation is detected after a fixed time has elapsed since a start of the second operation. The ratio between the detected insertion force and the detected pull-out force is computed, and the turnover of the lip is judged based on a result of the computation.

According to the invention as set forth in the twelfth aspect, the insertion force during the first operation and the pull-out force during the second operation are detected after a fixed time has elapsed since a start of the operation. Furthermore, the ratio between the detected insertion force and pull-out force is employed in the turnover judgment. Therefore, the insertion force or the pull-out force is detected after the insertion or pull-out operation has been stabilized. Even when external noise gets into the detected value of the insertion or pull-out force, the noise component is completely canceled and the turnover of the lip can be judged with an even higher degree of accuracy.

In the invention as set forth in a thirteenth aspect, when the seal is inserted on the shaft in the same procedure as the aforementioned, the insertion force applied during the first operation is detected after a fixed time has elapsed since a start of the first operation. Also, the insertion force applied during the third operation is detected after a fixed time has elapsed since a start of the third operation. The ratio between the detected two insertion forces is computed, and the turnover of the lip is judged based on a result of the computation.

According to the invention as set forth in the thirteenth aspect, the insertion force during the first operation and the insertion force during the third operation are detected after a fixed time has elapsed since a start of the operation. Furthermore, the ratio between the detected two insertion forces is employed in the turnover judgment. Therefore, the insertion force is detected after the insertion operation has been stabilized. Even when external noise gets into the detected value of the insertion force, the noise component is completely canceled and the turnover of the lip can be judged with an even higher degree of accuracy.

In the invention as set forth in the fifteenth aspect, when the seal is inserted on the shaft in the same procedure as the aforementioned, the insertion force during the first operation is detected over a predetermined time after a fixed time has elapsed since a start of the first operation. An average value of results of the detections is computed, and the turnover of the lip is judged based on the average value.

According to the invention as set forth in the fifteenth aspect, an error in the turnover judgment which is caused by unexpected noise can be eliminated in addition to the advantage of the case of the second aspect.

In the invention as set forth in a sixteenth aspect, when the seal is inserted on the shaft in the same procedure as the aforementioned, the pull-out force during the second operation is detected over a predetermined time after a fixed time has elapsed since a start of the second operation. An average value of results of the detections is computed, and the turnover of the lip is judged based on the average value.

According to the invention as set forth in the sixteenth aspect, an error in the turnover judgment which is caused by unexpected noise can be eliminated in addition to the advantage of the case of the third aspect.

In the invention as set forth in a seventeenth aspect, when the seal is inserted on the shaft in the same procedure as the aforementioned, the insertion force during the third operation is detected over a predetermined time after a fixed time has elapsed since a start of the third operation. An average value of results of the detections is computed, and the turnover of the lip is judged based on the average value.

According to the invention as set forth in the seventeenth aspect, an error in the turnover judgment which is caused by unexpected noise can be eliminated in addition to the advantage of the case of the fourth aspect.

In the invention as set forth in a nineteenth aspect, when the seal is inserted on the shaft in the same procedure as the aforementioned, the insertion force applied during the first operation is over a predetermined time after a fixed time has elapsed since a start of the first operation, and the average value of the detection results is computed. The pull-out force applied during the second operation is detected over a predetermined time after a fixed time has elapsed since a start of the second operation, and the average value of the detection results is computed. The ratio between the detected two average values is computed, and the turnover of the lip is judged based on a result of the computation.

According to the invention as set forth in the nineteenth aspect, an error in the turnover judgment which is caused by unexpected noise can be eliminated in addition to the advantage of the case of the sixth aspect.

In the invention as set forth in the twentieth aspect, when the seal is inserted on the shaft in the same procedure as the aforementioned, the insertion force applied during the first operation is over a predetermined time after a fixed time has elapsed since a start of the first operation, and the average value of the detection results is computed. The insertion force applied during the third operation is detected over a predetermined time after a fixed time has elapsed since a start of the third operation, and the average value of the detection results is computed. The ratio between the detected two average values is computed, and the turnover of the lip is judged based on a result of the computation.

According to the invention as set forth in the twentieth aspect, an error in the turnover judgment which is caused by unexpected noise can be eliminated in addition to the advantage of the case of the seventh aspect.

In the invention as set forth in a twenty-second aspect, when the seal is inserted on the shaft in the same procedure as the aforementioned, the insertion force applied during the first operation is sequentially measured to detect an insertion force waveform. The relative position between the shaft and the seal is estimated from a characteristic of the detected insertion force waveform. Insertion force is detected at the estimated position, and the turnover of the lip is judged based on a result of the detection.

According to the invention as set forth in the twenty-second aspect, an error in the measurement is reduced for each work piece and the turnover judgment can be accurately performed.

The invention as set forth in a twenty-fifth aspect is constituted by a turnover judgment method comprising the steps of: inserting a seal with a lip onto a shaft, while relatively rotating the seal and the shaft; detecting insertion force when the seal is inserted; and judging turnover of the lip, based on a result of the detection.

According to the invention as set forth in the twenty-fifth aspect, the turnover judgment of the lip configuration and the insertion operation can be performed at the same time. Therefore, the assembly time can be shortened.

In a seal inserting apparatus which inserts a seal with a lip onto a shaft by performing once or a plurality of times at a time a first operation in which the seal is inserted once onto a shaft at a first predetermined position, a second operation in which the seal is pulled out from the first predetermined position to a second predetermined position at which the seal does not slip out of the shaft, and a third operation in which the seal is again inserted on the shaft from the second predetermined position, the invention as set forth in a twenty-ninth aspect comprises detection means for detecting insertion force applied during the first operation and judgment means for judging turnover of the lip, based on a result of the detection.

According to the invention as set forth in the twenty-ninth aspect, the turnover of the lip is judged based on the insertion force applied during the first operation. Therefore, as with the case of the second aspect, when the lip is turned over, the turnover can be immediately detected.

In the same seal inserting apparatus as the aforementioned, the invention as set forth in a thirtieth aspect comprises detection means for detecting pull-out force applied during the second operation and judgment means for judging turnover of the lip, based on a result of the detection.

According to the invention as set forth in the thirtieth aspect, the turnover of the lip is judged based on the insertion force applied during the second operation. Therefore, as with the case of the third, with the state in which the seal is adapted to the shaft as compared with the first operation, the pull-out force is detected and the turnover of the lip can be judged with a high degree of accuracy.

In the same seal inserting apparatus as the aforementioned, the invention as set forth in a thirty-first aspect comprises detection means for detecting insertion force applied during the third operation and judgment means for judging turnover of the lip, based on a result of the detection.

According to the invention as set forth in the thirty-first aspect, the turnover of the lip is judged based on the insertion force applied during the third operation. Therefore, as with the case of the fourth aspect, with the state in which the seal is further adapted to the shaft as compared with the second operation, the insertion force is detected and the turnover of the lip can be judged with an even higher degree of accuracy.

In the same seal inserting apparatus as the aforementioned, the invention as set forth in a thirty-third aspect comprises detection means for detecting insertion force applied during the first operation and pull-out force applied during the second operation, ratio computation means for computing a ratio between the detected insertion force and the detected pull-out force, and judgment means for judging turnover of the lip, based on a result of the computation.

According to the invention as set forth in the thirty-third aspect, the turnover of the lip is judged based on the ratio between the insertion force during the first operation and the pull-out force during the second operation. Therefore, as with the case of the sixth aspect, even when external noise gets into the detected value of the insertion force or pull-out force, the noise component is easily canceled and the turnover of the lip can be judged with a high degree of accuracy.

In the same seal inserting apparatus as the aforementioned, the invention as set forth in a thirty-fourth aspect comprises detection means for detecting insertion force applied during the first operation and insertion force applied during the third operation, ratio computation means for computing a ratio between the detected two insertion forces, and judgment means for judging turnover of the lip, based on a result of the computation.

According to the invention as set forth in the thirty-fourth aspect, the turnover of the lip is judged based on the ratio between the insertion force during the first operation and the insertion force during the third operation. Therefore, as with the case of the sixth aspect, even when external noise gets into the detected values of the two insertion forces, the noise component is easily canceled and the turnover of the lip can be judged with a high degree of accuracy.

In the same seal inserting apparatus as the aforementioned, the invention as set forth in a thirty-sixth aspect comprises detection means for detecting pull-out force applied during the second operation after a fixed time has elapsed since a start of the second operation and judgment means for judging turnover of the lip, based on a result of the detection.

According to the invention as set forth in the thirty-sixth aspect, the pull-out force applied during the second operation is detected after a fixed time has elapsed since a start of the second operation Therefore, as with the case of the ninth aspect, the pull-out force is detected after the pull-out operation has been stabilized. Even when external noise gets into the detected value of the pull-out force, the noise component is easily canceled and the turnover of the lip can be judged with a high degree of accuracy.

In the same seal inserting apparatus as the aforementioned, the invention as set forth in a thirty-seventh aspect comprises detection means for detecting insertion force applied during the third operation after a fixed time has elapsed since a start of the third operation and judgment means for judging turnover of the lip, based on a result of the detection.

According to the invention as set forth in the thirty-seventh aspect, the insertion force applied during the third operation is detected after a fixed time has elapsed since a start of the third operation. Therefore, as with the case of the tenth aspect, the insertion force is detected after the pull-out operation has been stabilized Even when external noise gets into the detected value of the insertion force, the noise component is easily canceled and the turnover of the lip can be judged with a high degree of accuracy.

In the same seal inserting apparatus as the aforementioned, the invention as set forth in a thirty-ninth aspect comprises detection means for detecting insertion force applied during the first operation after a fixed time has elapsed since a start of the first operation and also detecting pull-out force applied during the second operation after a fixed time has elapsed since a start of the second operation, ratio computation means for computing a ratio between the detected insertion force and the detected pull-out force, and judgment means for judging turnover of the lip, based on a result of the computation.

According to the invention as set forth in the thirty-ninth aspect, the insertion force during the first operation and the pull-out force during the second operation are detected after a fixed time has elapsed since a start of the operation. Furthermore, the ratio between the detected insertion force and pull-out force is employed in the turnover judgment. Therefore, as with the case of the twelfth aspect, the insertion force or the pull-out force is detected after the insertion or pull-out operation has been stabilized. Even when external noise gets into the detected value of the insertion or pull-out force, the noise component is completely canceled and the turnover of the lip can be judged with an even higher degree of accuracy.

In the same seal inserting apparatus as the aforementioned, the invention as set forth in a fortieth aspect comprises detection means for detecting insertion force applied during the first operation after a fixed time has elapsed since a start of the first operation and also detecting insertion force applied during the third operation after a fixed time has elapsed since a start of the third operation, ratio computation means for computing a ratio between the detected two insertion forces, and judgment means for judging turnover of the lip, based on a result of the computation.

According to the invention as set forth in the fortieth aspect, the insertion force during the first operation and the insertion force during the third operation are detected after a fixed time has elapsed since a start of the operation. Furthermore, the ratio between the detected two insertion forces is employed in the turnover judgment. Therefore, as with the case of claim 13, the insertion force is detected after the insertion operation has been stabilized. Even when external noise gets into the detected value of the insertion force, the noise component is completely canceled and the turnover of the lip can be judged with an even higher degree of accuracy.

In the same seal inserting apparatus as the aforementioned, the invention as set forth in a forty-second aspect comprises detection means for detecting insertion force applied during the first operation over a predetermined time after a fixed time has elapsed since a start of the first operation, average value computation means for computing an average value of results of the detections, and judgment means for judging turnover of the lip, based on the average value According to the invention as set forth in the forty-second aspect, an error in the turnover judgment which is caused by unexpected noise can be eliminated in addition to the advantage of the case of the twenty-ninth aspect.

In the same seal inserting apparatus as the aforementioned, the invention as set forth in a forty-third aspect comprises detection means for detecting pull-out force applied during the second operation over a predetermined time after a fixed time has elapsed since a start of the second operation, average value computation means for computing an average value of results of the detections, and judgment means for judging turnover of the lip, based on the average value.

According to the invention as set forth in the forty-third aspect, an error in the turnover judgment which is caused by unexpected noise can be eliminated in addition to the advantage of the case of the thirtieth aspect.

In the same seal inserting apparatus as the aforementioned, the invention as set forth in a forty-fourth aspect comprises detection means for detecting insertion force applied during the third operation over a predetermined time after a fixed time has elapsed since a start of the third operation, average value computation means for computing an average value of results of the detections, and judgment means for judging turnover of the lip, based on the average value.

According to the invention as set forth in the forty-fourth aspect, an error in the turnover judgment which is caused by unexpected noise can be eliminated in addition to the advantage of the case of the thirty-first aspect.

In the same seal inserting apparatus as the aforementioned, the invention as set forth in a forty-sixth aspect comprises: detection means for detecting insertion force applied during the first operation over a predetermined time after a fixed time has elapsed since a start of the first operation and also detecting pull-out force applied during the second operation over a predetermined time after a fixed time has elapsed since a start of the second operation; average value computation means for computing an average value of results of the detections performed during the first operation and also computing an average value of results of the detections performed during the second operation; ratio computation means for computing a ratio between the detected two average values; and judgment means for judging turnover of the lip, based on the computed ratio.

According to the invention as set forth in the forty-sixth aspect, an error in the turnover judgment which is caused by unexpected noise can be eliminated in addition to the advantage of the case of the thirty-third aspect.

In the same seal inserting apparatus as the aforementioned, the invention as set forth in a forty-seventh aspect comprises: detection means for detecting insertion force applied during the first operation over a predetermined time after a fixed time has elapsed since a start of the first operation and also detecting insertion force applied during the third operation over a predetermined time after a fixed time has elapsed since a start of the third operation; average value computation means for computing an average value of results of the detections performed during the first operation and also computing an average value of results of the detections performed during the third operation; ratio computation means for computing a ratio between the detected two average values; and judgment means for judging turnover of the lip, based on the computed ratio.

According to the invention as set forth in the forty-seventh aspect, an error in the turnover judgment which is caused by unexpected noise can be eliminated in addition to the advantage of the case of the thirty-fourth aspect.

In the same seal inserting apparatus as the aforementioned, the invention as set forth in a forty-ninth aspect comprises: means for sequentially measuring insertion force applied during the first operation to detect an insertion force waveform; detection means for estimating relative position between the shaft and the seal from a characteristic of the detected insertion force waveform and detecting insertion force at the estimated position; and judgment means for judging turnover of the lip, based on a result of the detection.

According to the invention as set forth in the forty-ninth aspect, an error in the measurement is reduced for each work piece and the turnover judgment can be accurately performed.

The invention as set forth in a fifty-second aspect is constituted by an apparatus for inserting a seal with a lip onto a shaft, comprising: a chuck for directly or indirectly clamping the seal; detection means for detecting insertion force when the seal clamped by the chuck is inserted onto the seal; and judgment means for judging turnover of the lip, based on a result of the detection The invention as set forth in a fifty-third aspect is constituted by an apparatus for inserting a seal with a lip onto a shaft, comprising: a chuck for directly or indirectly clamping the seal; detection means for detecting insertion force when the seal clamped by the chuck is inserted onto the seal and also detecting pull-out force when the seal is pulled out to a position at which the seal does not slip out of the shaft; and judgment means for judging turnover of the lip, based on a result of the detection.

According to the invention as set forth in the fifty-second or fifty-third aspect, the turnover of the lip is judged based on the insertion force or pull-out force of the seal. Therefore, the turnover of the lip can be judged without providing large-scale equipment.

In a seal inserting apparatus which inserts a seal with a lip onto a shaft while relatively rotating the seal and the shaft, the invention as set forth in claim 55 comprises detection means for detecting insertion force when the seal is inserted and judgment means for judging turnover of the lip, based on a result of the detection.

According to the invention as set forth in a fifty-first aspect, the turnover judgment of the lip configuration and the insertion operation can be performed at the same time. Therefore, as with the case of claim 29, the assembly time can be shortened.

The above and other objects and advantages of the present invention will become apparent from the following detailed description of the preferred embodiments of the invention when read in conjunction with the accompanying drawings.

BRIEF DESCRIPTION OF THE DRAWINGS

FIG. 22 is a sectional view used to explain a method of returning the turnover of the lip by utilizing a D-cutout portion provided in the point end portion of the shaft;

FIG. 23(A) is a front view of the shaft having a D-cutout portion;

FIG. 23(B) is a cross sectional view taken substantially along line B—B of FIG. 23(A);

FIG. 33(A) is a perspective view showing how the seal attaching member and the shaft are connected together, they being connected by means of a square protrusion and a square hole;

FIG. 33(B) is a perspective view showing how the seal attaching member and the shaft are connected together, they being connected by means of a cylindrical protrusion and a cylindrical hole;

FIG. 33(C) is a perspective view showing how the seal attaching member and the shaft are connected together, they being connected by means of a cylindrical protrusion, a cylindrical hole, and a magnet;

FIG. 33(D) is a perspective view showing how the seal attaching member and the shaft are connected together, they being connected by means of a magnet;

DETAILED DESCRIPTION OF THE PREFERRED EMBODIMENTS

An embodiment of the present invention will hereinafter be described in detail in reference to the drawings.

Figure 1:
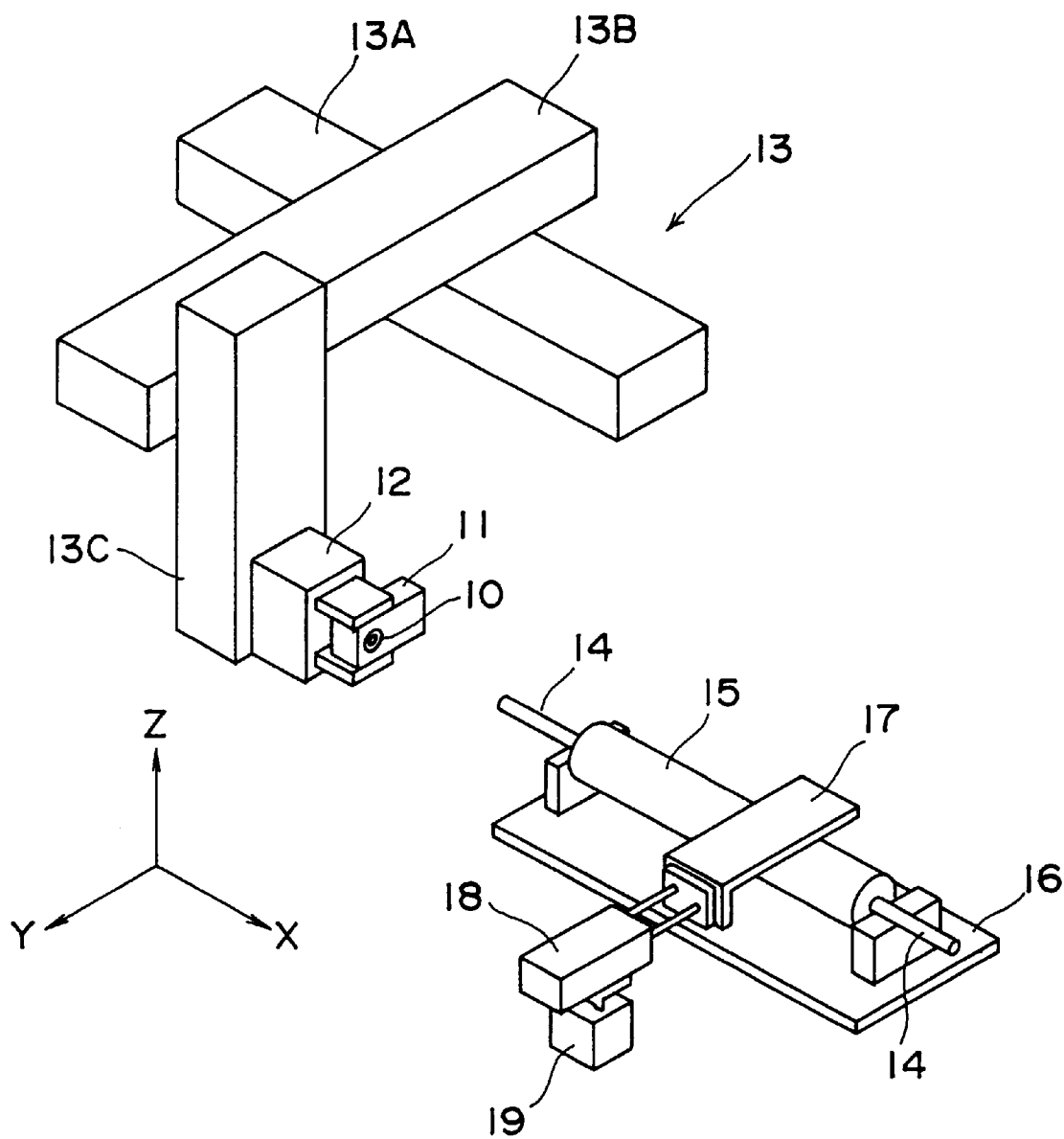
FIG. 1 is a perspective view showing a seal inserting apparatus which inserts a seal onto a shaft, while rotating the shaft.

Referring to FIG. 1, there is shown a seal inserting apparatus according to the present invention. In the figure, reference numeral 10 denotes a seal with a lip. This seal 10 is held by a holding member 11. The holding member 11 is clamped by a chuck hand 12, and the seal 10 is indirectly clamped by the chuck hand 12. Of course, the seal 10 may be directly clamped by the chuck hand 12 without intervention of the holding member 11.

The chuck hand 12 is attached to a robot 13 so that it can freely be reciprocated in X, Y, and Z directions shown in FIG. 1. The robot 13 is equipped with a first member 13A arranged in the X direction, a second member 13B arranged in the Y direction, and a third member 13C arranged in the Z direction. The second member 13B reciprocates in the X direction along the first member 13A. The third member 13C reciprocates in the Y direction along the second member 13B. The chuck hand 12 reciprocates in the Z direction along the third member 13C. In this embodiment, while the robot 13 has three axes, it may have a single axis or two axes Furthermore, the present invention is not limited to the orthogonal type, but it is also applicable to a scalar type or polar coordinate type of robot.

Reference numeral 14 denotes a shaft into which the seal 10 is inserted. The shaft 14 is attached to the end face of a cylindrical or tubular component 15. This component 15 is provided over a working table 16 so that it is freely rotatable. A rotation application plate 17 is provided above the component 15, and one end of the plate 17 is connected to a first cylinder 18. The first cylinder 18 is supported by a second cylinder 19. The rotation application plate 17, the first cylinder 18, and the second cylinder 19 as a whole constitute a rotational-force application mechanism for applying rotational force to the component 15.

In this seal inserting apparatus, when the seal 10 is inserted onto the shaft 14, the holding member 11 is clamped with the chuck hand 12 and the first cylinder 18 is pulled downward by the second cylinder 19. If the first cylinder 18 is pulled downward, the rotation application plate 17 can be pressed against the exterior circumference of the component 15. In this position, if the rotation application plate 17 is reciprocated in the Y direction by the first cylinder 18, the component 15 will repeat rotation and reverse rotation with the shaft 14. Then, the robot 13 is driven to move the chuck hand 12 in the Y or Z direction so that the center of the seal 10 held by the holding member 11 is aligned with the center axis of the shaft 14. The chuck hand 12 is also moved in the X direction to move the seal 10 toward the end of the shaft 14, and the seal 10 is inserted onto the shaft 14 being rotated or reversely rotated.

At this time, the shaft 14 and the lip of the seal 10 are rubbed with each other in the rotational direction, and the friction between them is reduced in the direction in which the seal 10 is inserted. Also, if the movement quantity of the chuck hand 12 is adjusted when moving in the X direction, the seal 10 can be inserted onto the shaft 14 at a desired position.

Figure 2:
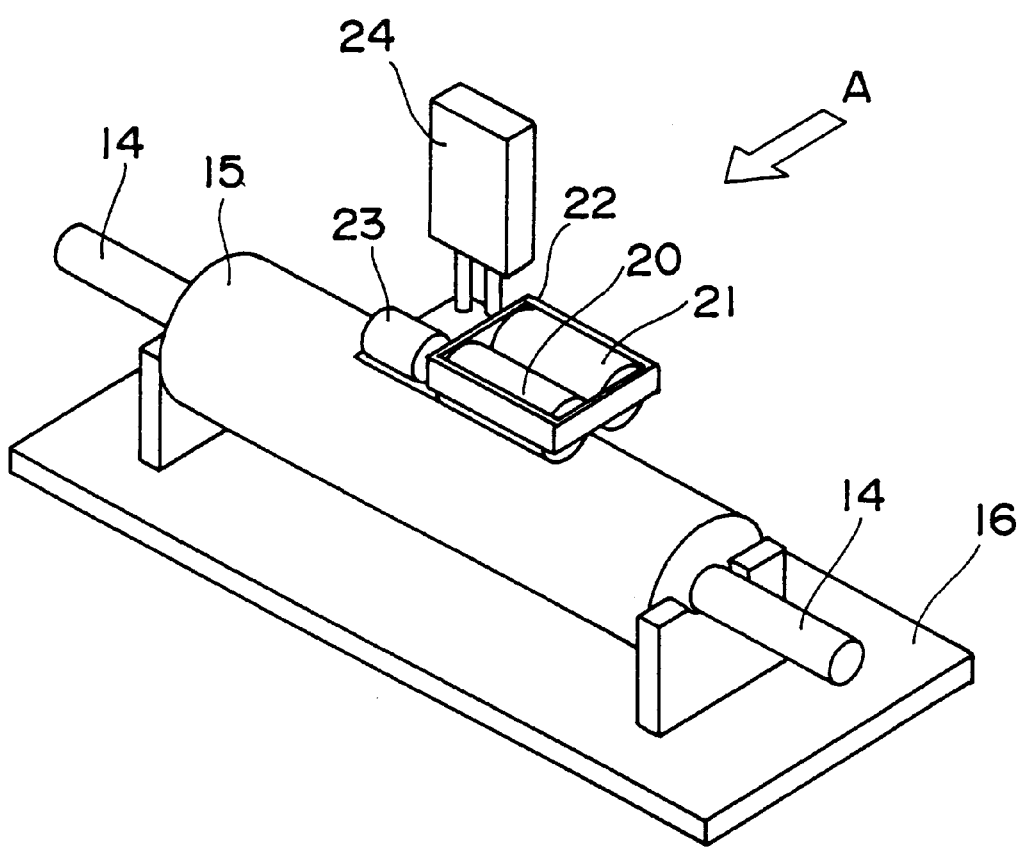
FIG. 2 is a perspective view showing another example of the rotation application mechanism shown in FIG. 1.

FIG. 2 shows another example of the rotation application mechanism. In this example, above the component 15 a rotating roller 20 and a driven roller 21 are arranged in parallel to the component 15. The rotating roller 20 and the driven roller 21 are provided in a support body 22 so that they are freely rotatable, and both exterior circumferences 20 and 21 abut each other. A motor 23 is provided above the support body 22 and is connected to the rotating roller 20. If the motor 23 is rotated, the rotating roller 20 and the driven roller 21 will rotate in directions opposite to each other. The support body 22 is connected to a cylinder 24.

When the seal 10 is inserted onto the shaft 14, the cylinder 24 is driven to move the support body 22 downward. If the rotating roller 20 is pressed against the exterior circumference of the component 15, the rotational drive force of the motor 23 will be transmitted to the component 15 through the rotating roller 20, and the component 15 will rotate with the shaft 14. When the component 15 is reversely rotated, the support body 22 is moved in a direction of arrow A by a cylinder (not shown) so that the driven roller 21 abut the exterior circumference of the component 15. Note that if either the rotating roller 20 or the driven roller 21 is used, the shaft 14 can be rotated continuously in one direction.

In the rotation application mechanism shown in FIG. 2, while the rotating roller 20 and the driven roller 21 has contacted each other at the respective exterior circumferences so that they rotate in opposite directions, they may be separated from each other to rotate only the rotating roller 20 with the motor 23. If they are constructed in this way, both the rotating roller 20 and the driven roller will simultaneously abut the exterior circumference of the component 15 when the support body 22 is pushed downward, and the rotating roller 20, driven roller 21, and the component 15 can rotate in a stable position. Note that in this case, if the motor 23 is reversely rotated, the component 15 can be reversely rotated.

Figure 3:
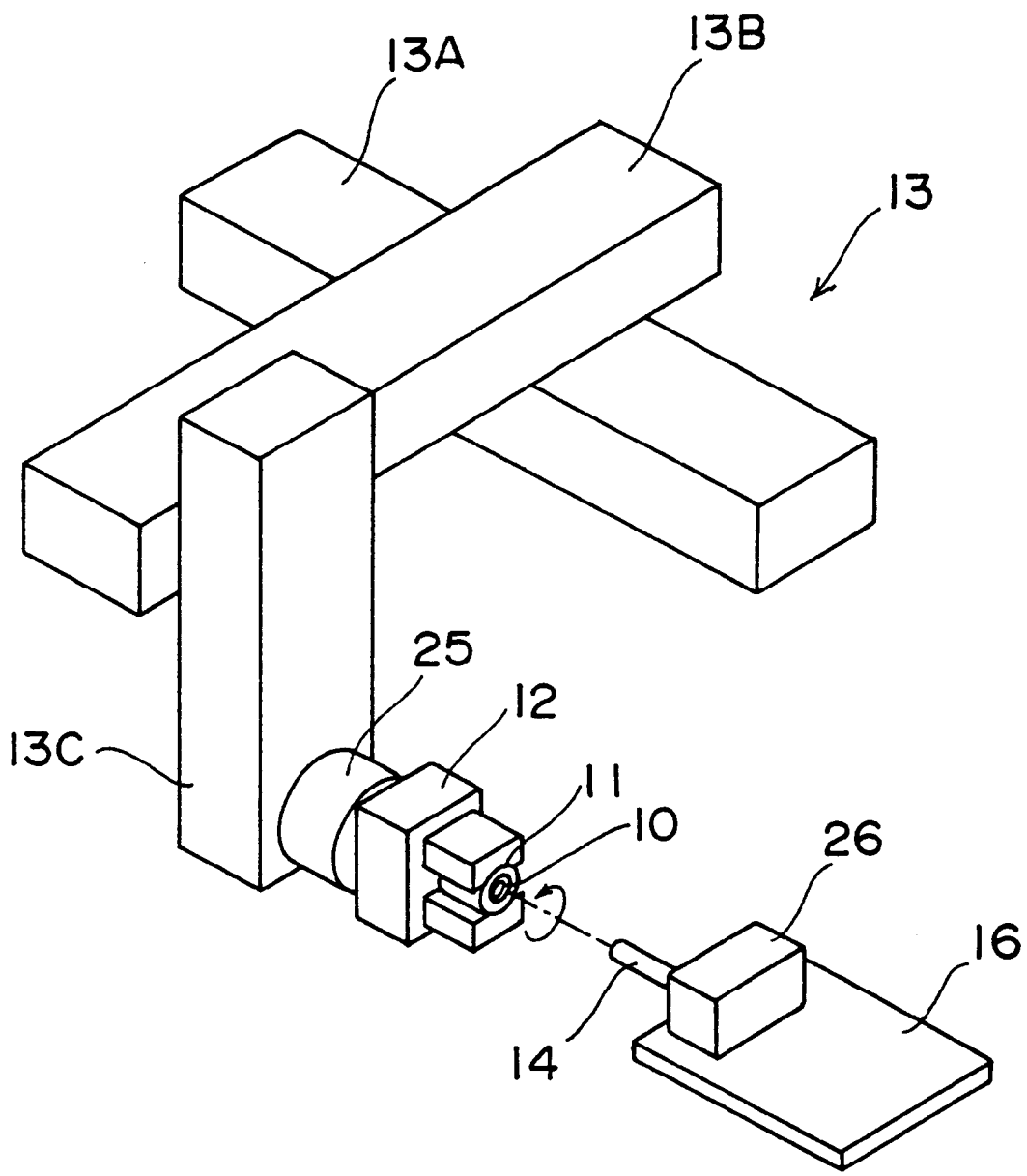
FIG. 3 is a perspective view showing a seal inserting apparatus which inserts a seal onto a shaft, while rotating the seal.

In FIGS. 1 and 2 the component 15 has been rotated, but there are cases where a component cannot be rotated. In such a case, the seal 10 is rotated. The example is shown in FIG. 3. In the figure, the chuck hand 12 is attached to the robot 13 through a rotary mechanism 25. The rotary mechanism 25 is rotatable in both directions, and with rotation of the rotary mechanism 25, the chuck hand 12 also rotates in both directions. On the other hand, a component 26 placed on the working table 16 is, for example, a rectangular cube and cannot be rotated. To this component 26 the shaft 14 is attached.

When the seal 10 is inserted onto the shaft 14, the robot 13 is driven so that the center of the seal 10 held by the holding member 11 is aligned with the center axis of the shaft 14. Then, while the seal 10 is being rotated or reversely rotated by the rotary mechanism 25, it is inserted onto the shaft 14. As with the case of FIG. 1 or 2, the shaft 14 and the lip of the seal 10 are rubbed with each other in the rotational direction, and the friction between them is reduced in the seal inserting direction. The rotary mechanism 25 preferably is constituted by a rotary mechanism which is rotated by a motor or a rotary cylinder.

Figure 4:
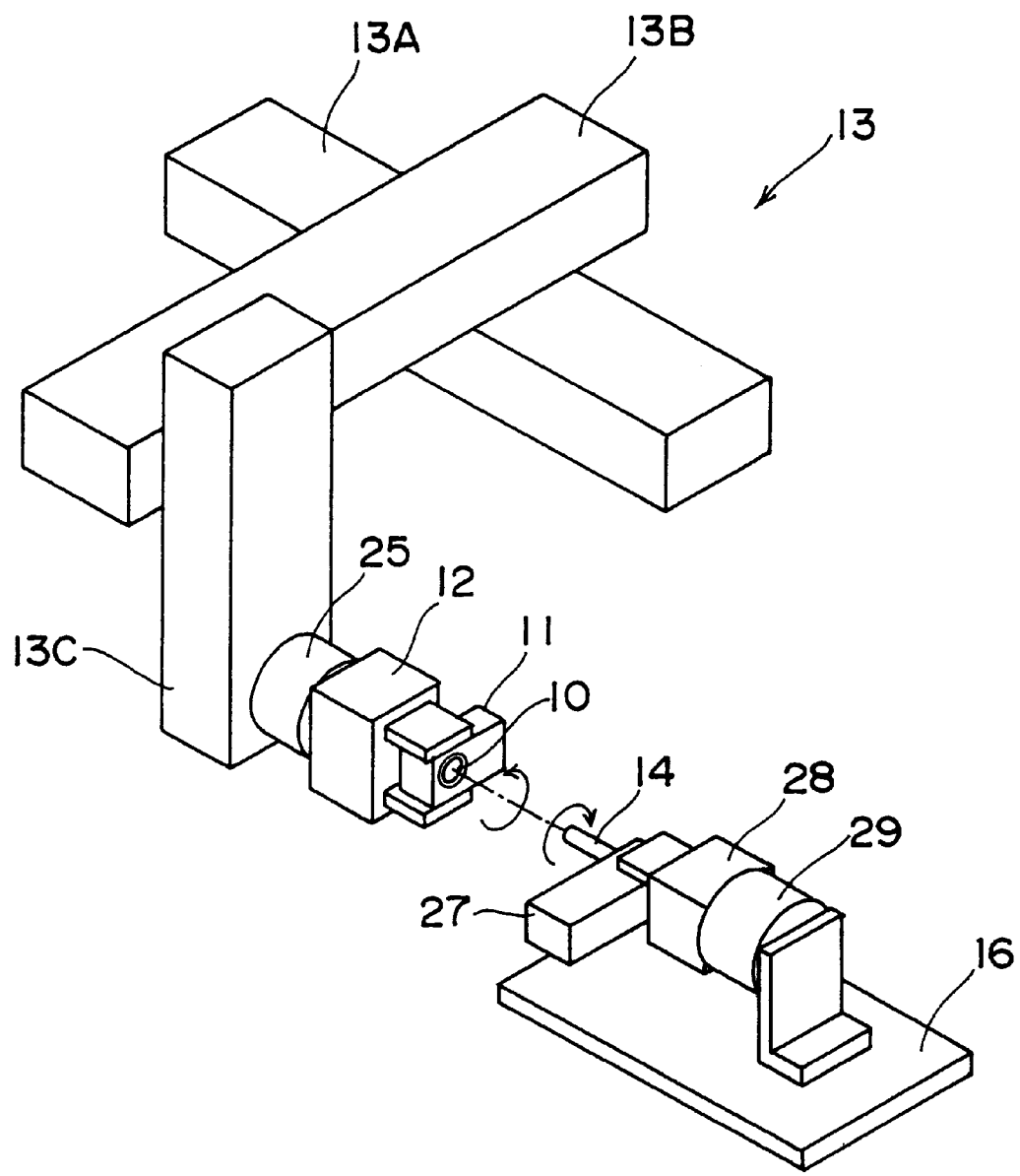
FIG. 4 is a perspective view showing a seal inserting apparatus which inserts a seal onto a shaft, while rotating both the seal and the shaft.
Figure 13:
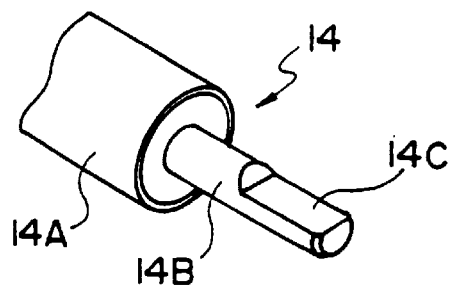
FIG. 13 is an enlarged perspective view showing the shaft into which a seal is inserted.

FIG. 4 shows an example of the case where both a component and a shaft are rotated to insert a seal onto the shaft. In the example of FIG. 4, when a component 27 placed on a working table 16 cannot be directly rotated, both a seal 10 and the component 27 are rotated. A first chuck hand 12, as with the case of FIG. 13, is attached to a robot 13 through a first rotary mechanism 25. On the other hand, the component 27 is clamped by a second chuck hand 28. This chuck hand 28 is fixed on the working table 16 through a second rotary mechanism 29. To the component 27 a shaft 14 is connected.

When the seal 10 is inserted onto the shaft 14, the first chuck hand 12 is rotated by the first rotary mechanism 25, and the component 27 is also rotated by the second rotary mechanism 29. That is, while the seal 10 and the shaft 14 are being rotated, the seal 10 is inserted onto the shaft 14. Therefore, the shaft 14 and the lip of the seal 10 are rubbed with each other in the rotational direction, and the friction in the seal inserting direction is reduced. Note that the second rotary mechanism 29 is preferable to be a rotary mechanism which is rotated by a motor or a rotary cylinder. Also, the rotational directions of the rotary mechanisms 25 and 29 are preferably opposite to each other.

Now, a detailed description will be given of the structure of the aforementioned robot 13.

Figure 5:
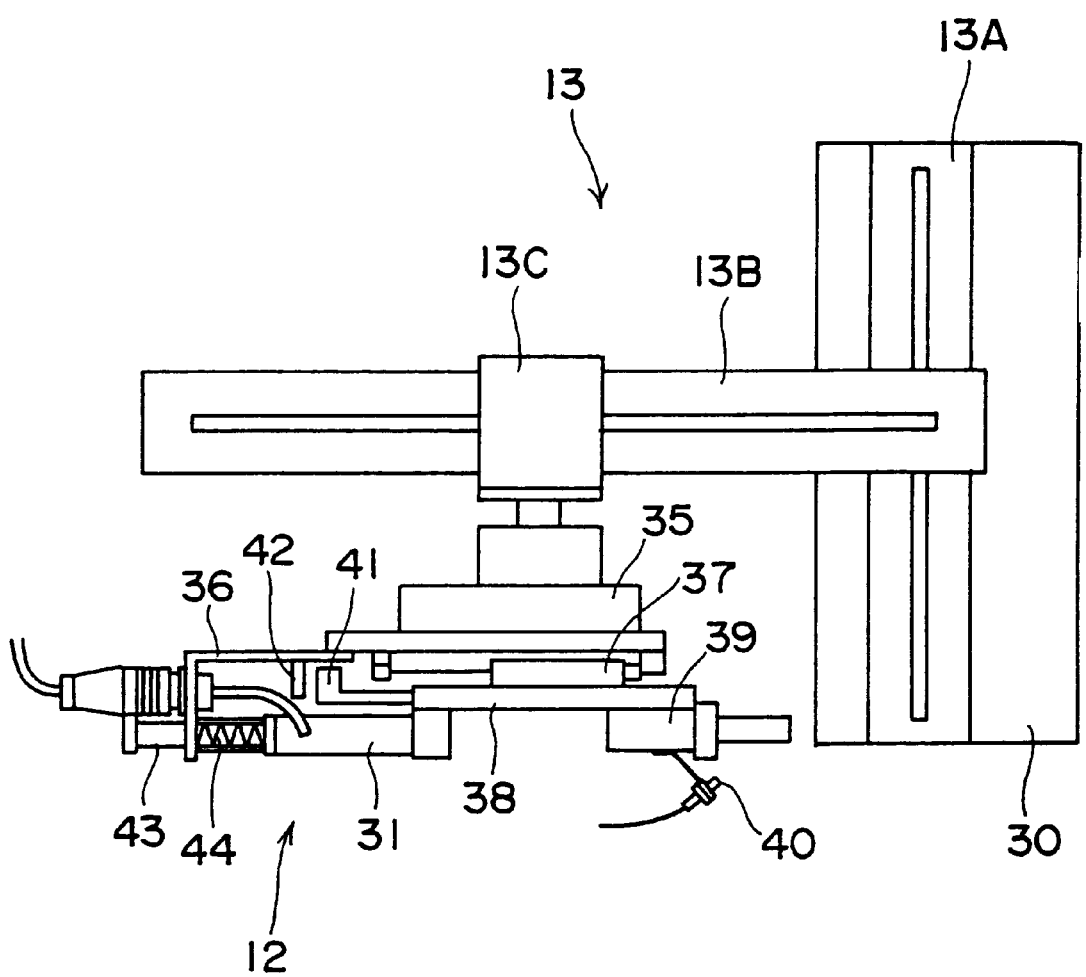
FIG. 5 is a plan view of a robot for inserting the seal.
Figure 6:
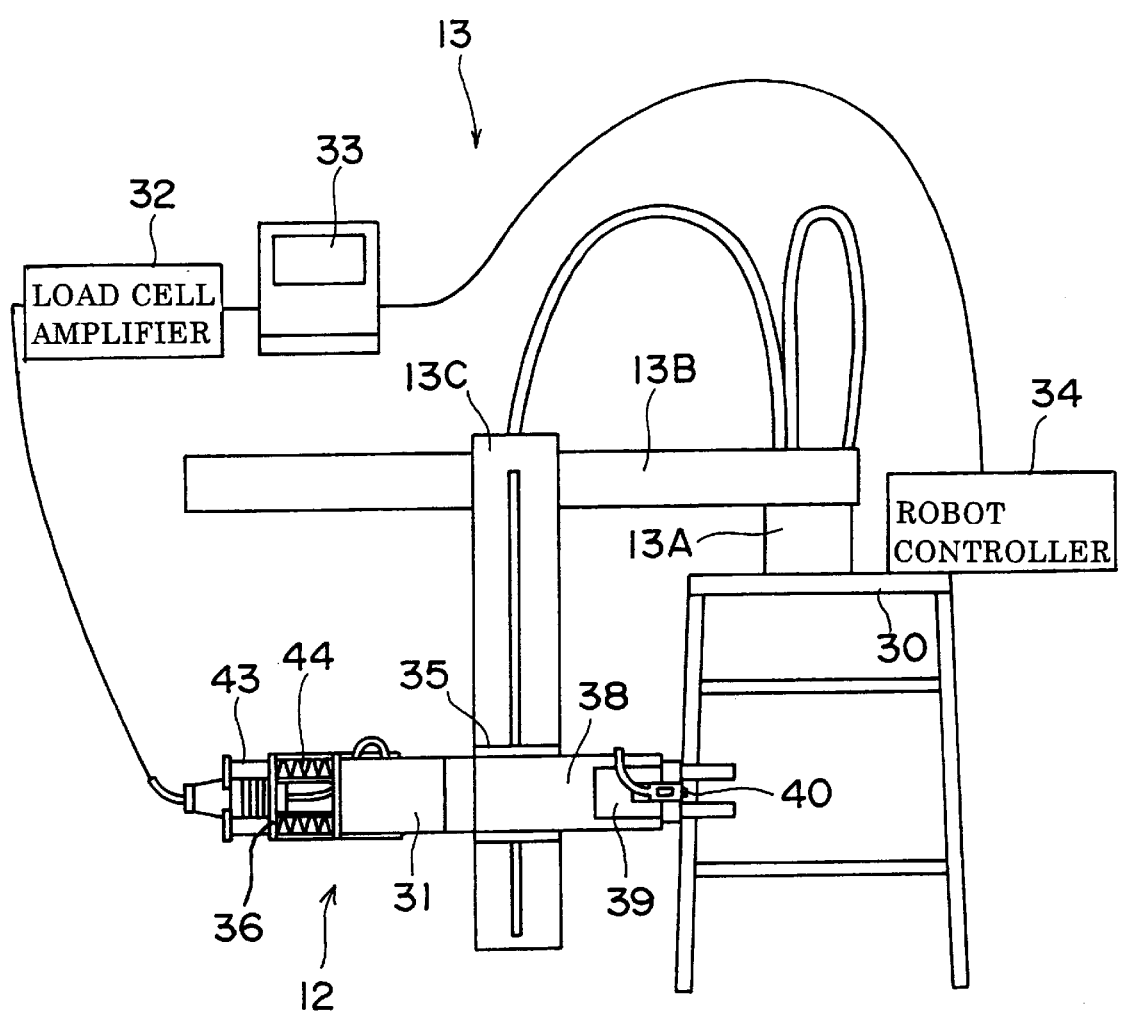
FIG. 6 is a side view of the robot shown in FIG. 5.

FIG. 5 is a plan view of the robot 13 and FIG. 6 is a side view of the robot 13. The robot 13 is mounted on a support table 30 and is positioned with respect to the working table 16 (FIG. 1 or FIG. 3). The chuck hand 12 is provided with a load cell 31. The load cell 31 sends a detection signal (load detection signal) to a computer 33 through a load cell amplifier 32. A robot controller 34 is provided for controlling the operation of the robot 13. The robot controller 34 and the computer 33 are connected with each other for signal transmission and reception therebetween.

Figure 7:
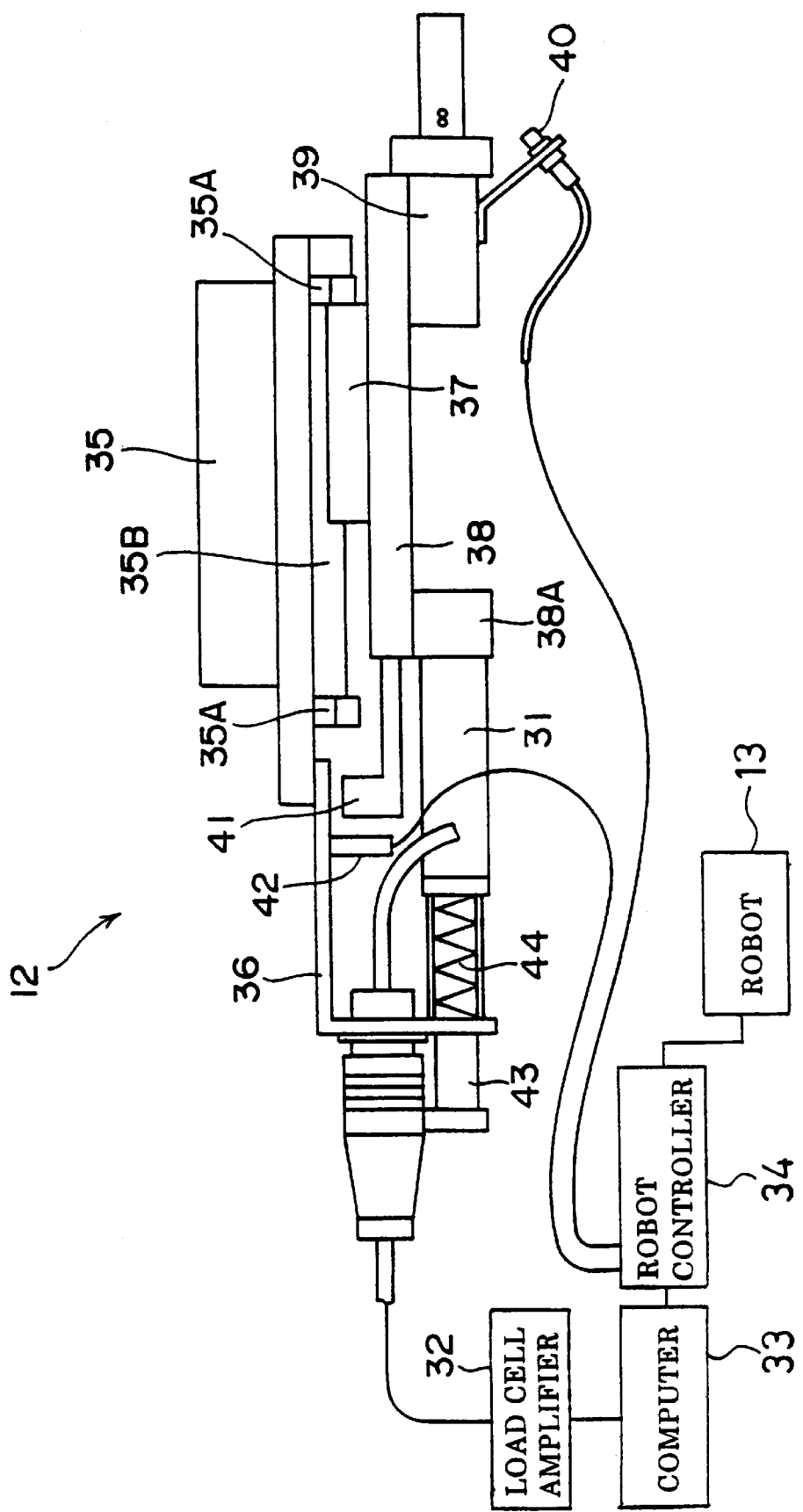
FIG. 7 is a plan view showing the chuck hand.
Figure 8:
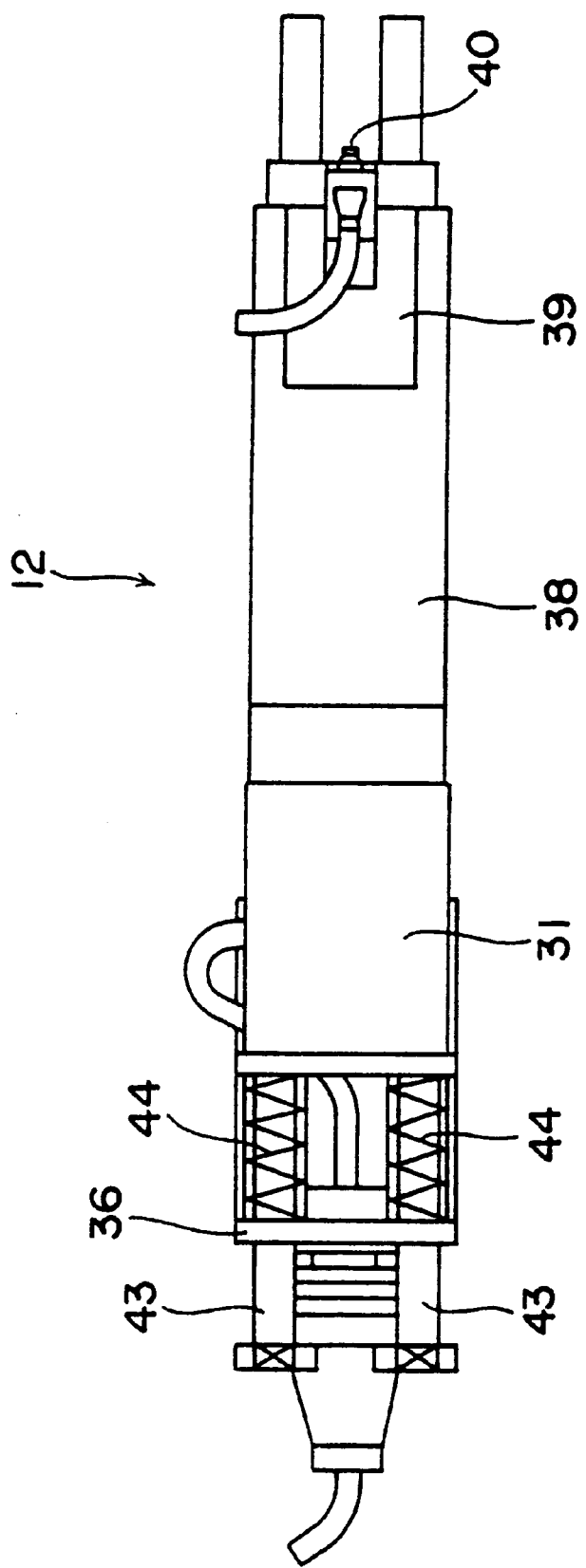
FIG. 8 is a side view of the chuck hand shown in FIG. 7.

FIG. 7 is a plan view showing the detail structure of the chuck hand 12 and FIG. 8 is a side view of the chuck hand 12. The chuck hand 12 is attached to the hand attaching portion of the robot 13 through a base 35. The base 35 shown in FIG. 7 is provided for sliding the chuck hand 12 in a vertical direction (Z direction) along the hand attaching portion of the robot 13, but if the base 35 is replaced with the rotary mechanism 25 shown in FIGS. 3 and 4, it will be possible to rotate the chuck hand 12. This arrangement can cope with the case where the direction (direction in which a seal is supplied) in which the chuck hand 12 chucks the seal 10 or the aforementioned holding member 11 (the seal and the holding member will hereinafter be referred to as a seal) differs from the direction in which a seal is inserted.

The rear end of the base 35 (in FIG. 7 the left direction is rear and the right direction is front) is fixed to an L-shaped bracket 36. The central flat portion of the base 35 is provided with a guide rail 35B having stoppers 35A at both ends thereof To the guide rail 35B a slide portion 37 is attached. The slide portion 37 is movable in a lateral direction of FIG. 7 (seal inserting direction) along the guide rail 35B.

A movable base 38 is fixed to the slide portion 37. At the front end of the movable base 38 a seal chuck 39 is attached for clamping a seal. The seal chuck 39 is provided with a seal sensor 40 for detecting whether or not there is a seal. This seal sensor 40 informs the robot controller 34 of whether or not there is a seal.

A jam detection dog 41 is attached to the rear end of the movable base 38. If the movable base 38 is moved in a direction (left direction in FIG. 7) away from a work piece, the jam detection dog 41 will cross a jam sensor 42 fixed to the L-shaped bracket 36. The aforementioned load cell 31 is fixed to the rear end of the movable base 38 through an attaching block 38A.

The rear end of the load cell 31 remote from the attaching block 38A is provided with two shafts 43 each having a flanged end. The shafts 43 are inserted into holes formed in the bracket 36, respectively. Between the rear end of the load cell 31 and the bracket 36, there are provided two coil springs 44. The coil springs 44 are inserted onto the shafts 43, respectively. Between the coil spring 44 and the shaft 43, a gap is formed so that the coil spring 44 does not contact the shaft 43. When a seal inserting operation is not performed, the slide portion 37 is urged by the coil springs 44 and is pressed against the stopper 35A on the side near the chuck 39.

Figure 9:
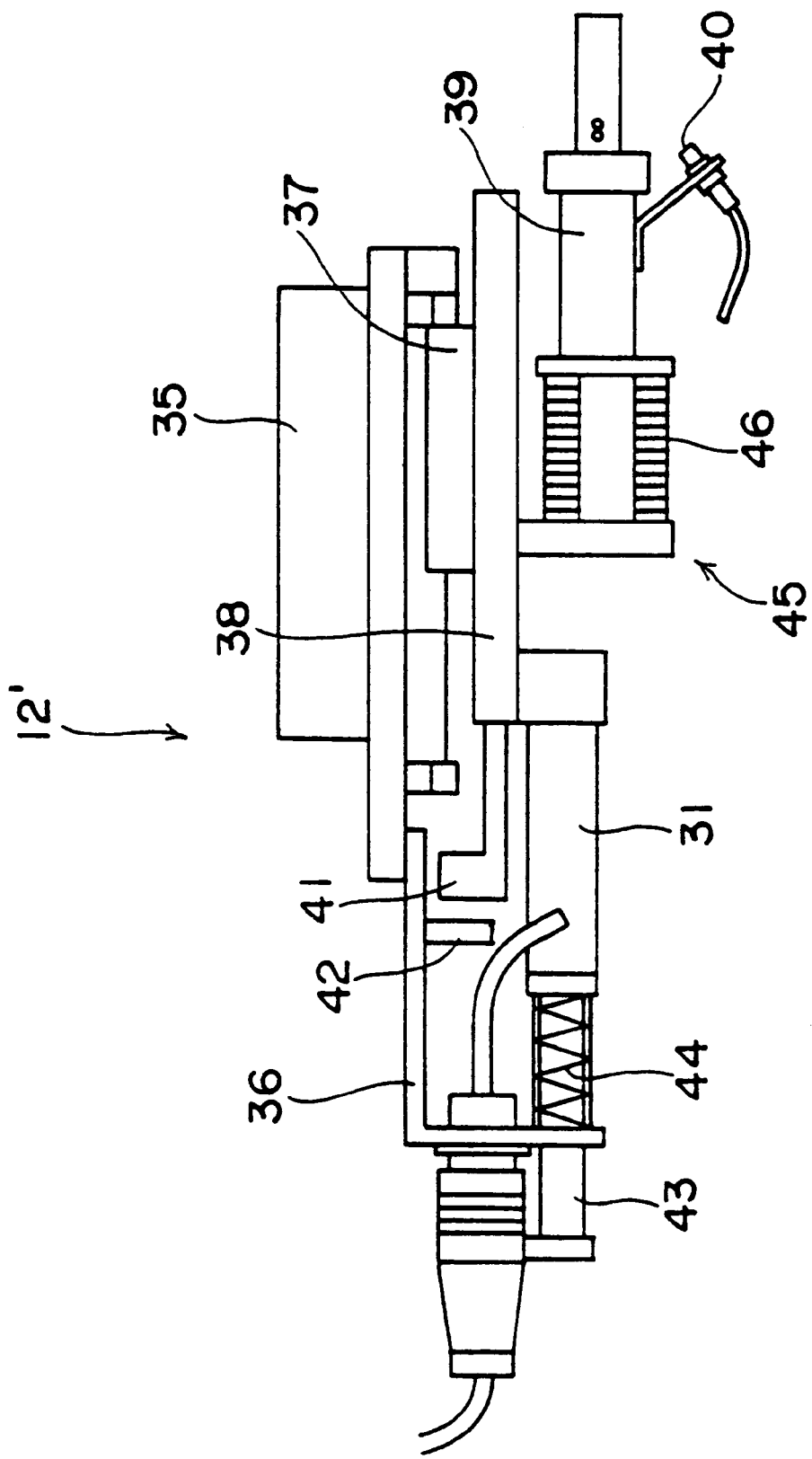
FIG. 9 is a plan view showing another example of the chuck hand.
Figure 10:
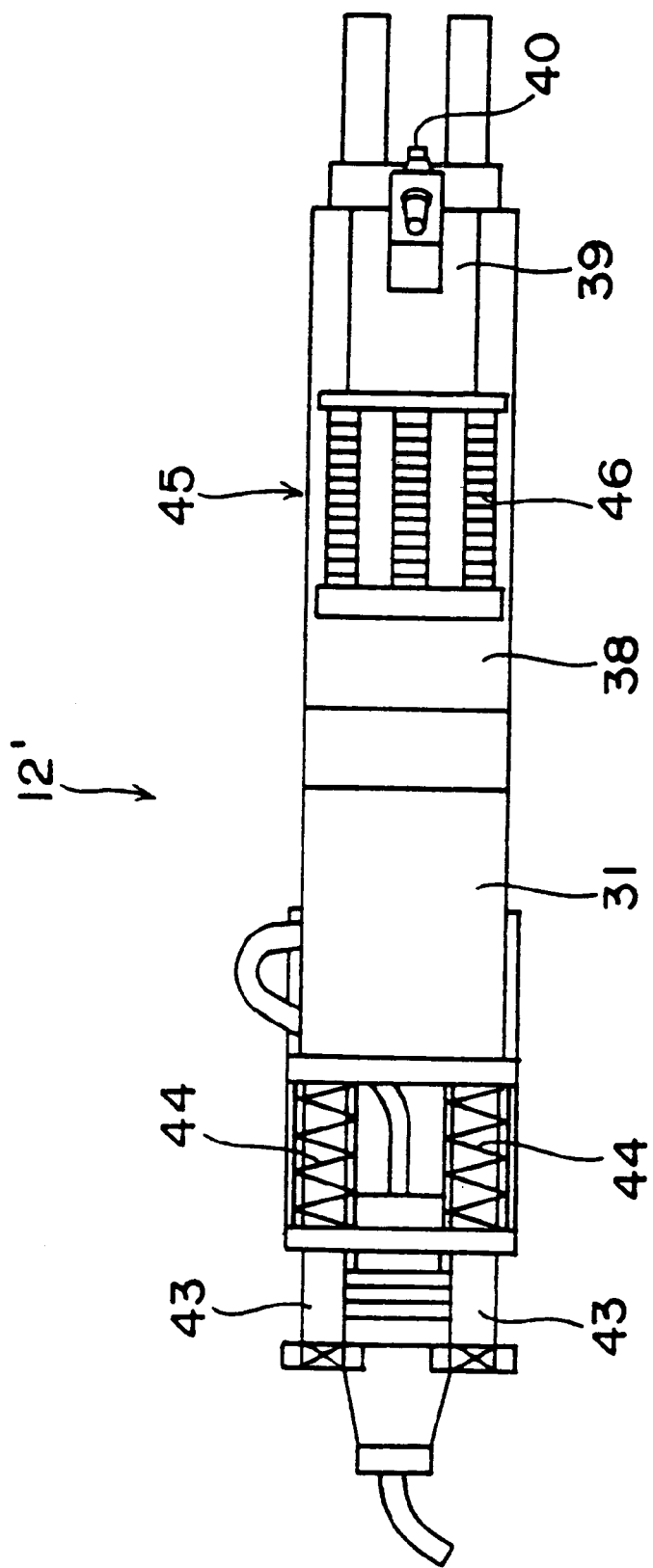
FIG. 10 is a side view of the chuck hand shown in FIG. 9.

FIGS. 9 and 10 show another example of the chuck hand. FIG. 9 is a plan view of a chuck hand 12' and FIG. 10 is a side view of the chuck hand 12'. In this chuck hand 12', a correction mechanism 45 is provided between a movable base 38 and a chuck 39 in order to correct offset between a seal and a seal inserting shaft. The correction mechanism 45 is constituted by a plurality of correction members 46 which bend in the radial direction of the seal inserting shaft but do not expand in the axial direction. In the embodiment shown in FIGS. 9 and 10, three correction members 46 are arranged in parallel to each other. Thus, the correction mechanism 45 can move the chuck 39 only in the radial direction of the aforementioned seal inserting shaft.

Figure 11:
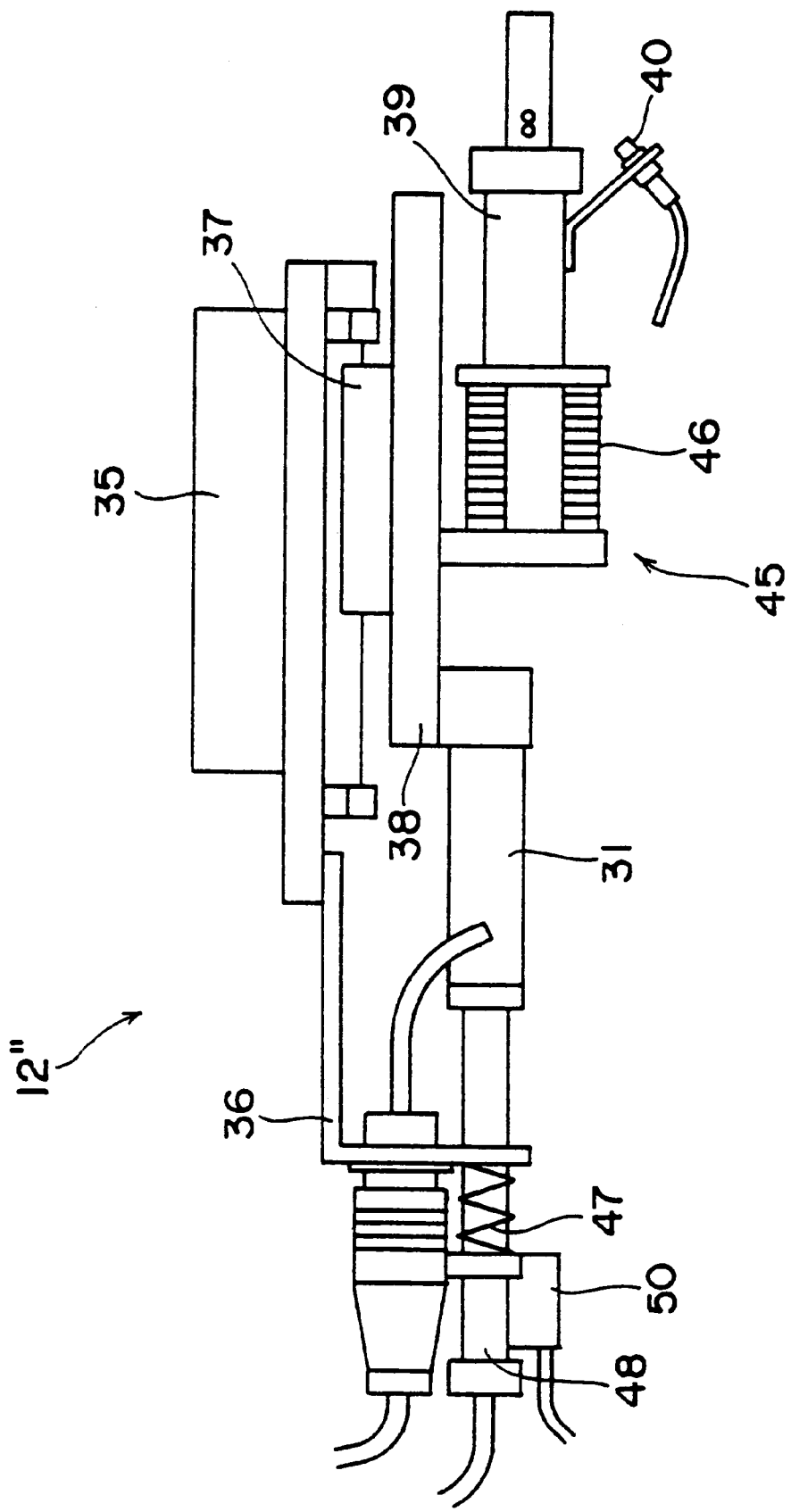
FIG. 11 is a plan view showing still another example of the chuck hand.
Figure 12:
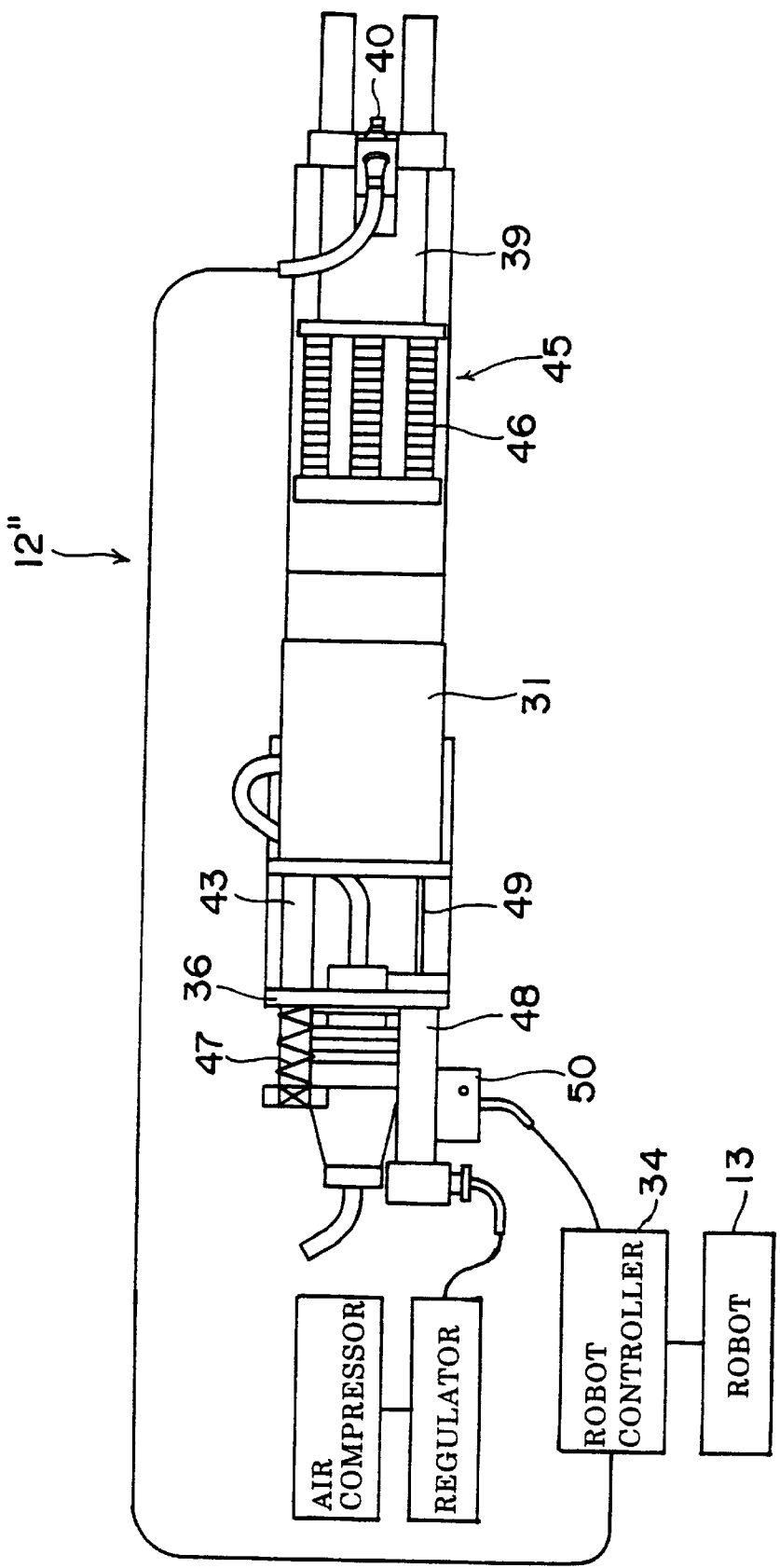
FIG. 12 is a side view of the chuck hand shown in FIG. 11.

FIGS. 11 and 12 show still another example of the chuck hand. FIG. 11 is a plan view of a chuck hand 12" and FIG.

12 is a side view of the chuck hand 12". The chuck hand 12' is provided with a coil spring 47, an air cylinder 48, a shaft 49, and a sensor 50 instead of the jam detection dog 41, jam sensor 42, and coil spring 44 provided in the aforementioned chuck hand 12'. This example is provided with only a single shaft 43.

The coil spring 47 is provided between the flange portion of the shaft 43 and the bracket 36 so that it does not contact the exterior circumference of the shaft 43. The air cylinder 48 is fixed to the surface of the bracket 36 remote from the load cell 31. The air cylinder 48 is provided with the shaft 49, which in turn contacts the rear end of the load cell 31. The air cylinder 48 is further provided with the sensor 50 for detecting the position of the shaft 49. The sensor 50 is connected to a robot controller 34 so that hand jam information can be sent to the robot controller 34. The force for pushing out the shaft 49 of the air cylinder 48 is stronger than the urging force of the spring 47. In the position where the shaft 49 is fully pushed out of the cylinder 48, the shaft 49 can be positioned. At this position, the chuck 39 mounted on the movable base 38 can be positioned. In FIG. 12, reference numeral 51 denotes an air compressor, which supplies air to the air cylinder 48. Reference numeral 52 denotes a regulator which controls the flow rate of air.

Figure 14:
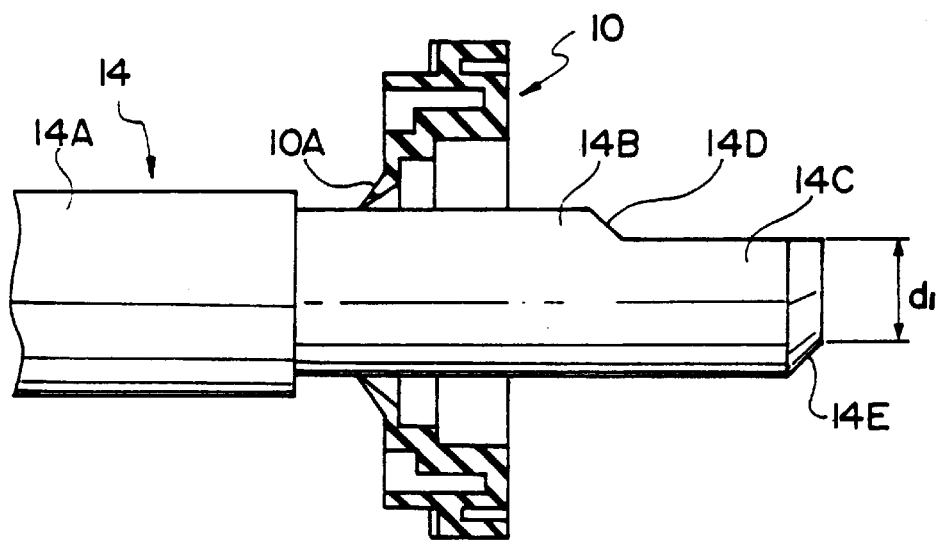
FIG. 14 is a sectional view of the seal normally inserted on the shaft.
Figure 15:
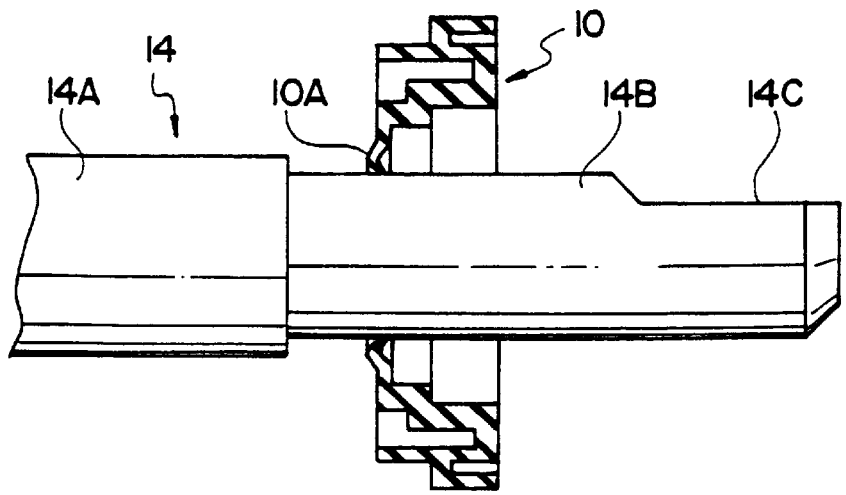
FIG. 15 is a sectional view of the seal abnormally inserted on the shaft.

FIG. 13 is an enlarged perspective view showing the shaft 14 into which a seal is inserted. Although not shown in FIGS. 1 through 4, the shaft 14 consists of a cylindrical large-diameter portion 14A, an axial portion 14B protruding from the large-diameter portion 14A, and a D-cutout portion 14C formed in the point end of the axial portion 14B. FIG. 14 shows an example of the case where the seal 10 with a lip 10A is fitted on the shaft 14 in a normal state (where the lip 10A is not turned over), while FIG. 15 shows an example of the case where the seal 10 is fitted on the shaft 14 in an abnormal state (where the lip 10A is turned over). In the state of FIG. 14 there is no turnover of the lip 10A, and in the state in which the seal 10 is set on the shaft 14, there is no possibility that oil or dust will flow from the large-diameter portion 14A of the shaft toward the D-cutout portion 14C. On the other hand, in the state of FIG. 15, since the lip 10A has been turned over, oil or dust will flow from the large-diameter portion 14A of the shaft toward the D-cutout portion 14C.

Now, a description will be given of the seal inserting operation which is performed by the aforementioned embodiment of the present invention.

Figure 16:
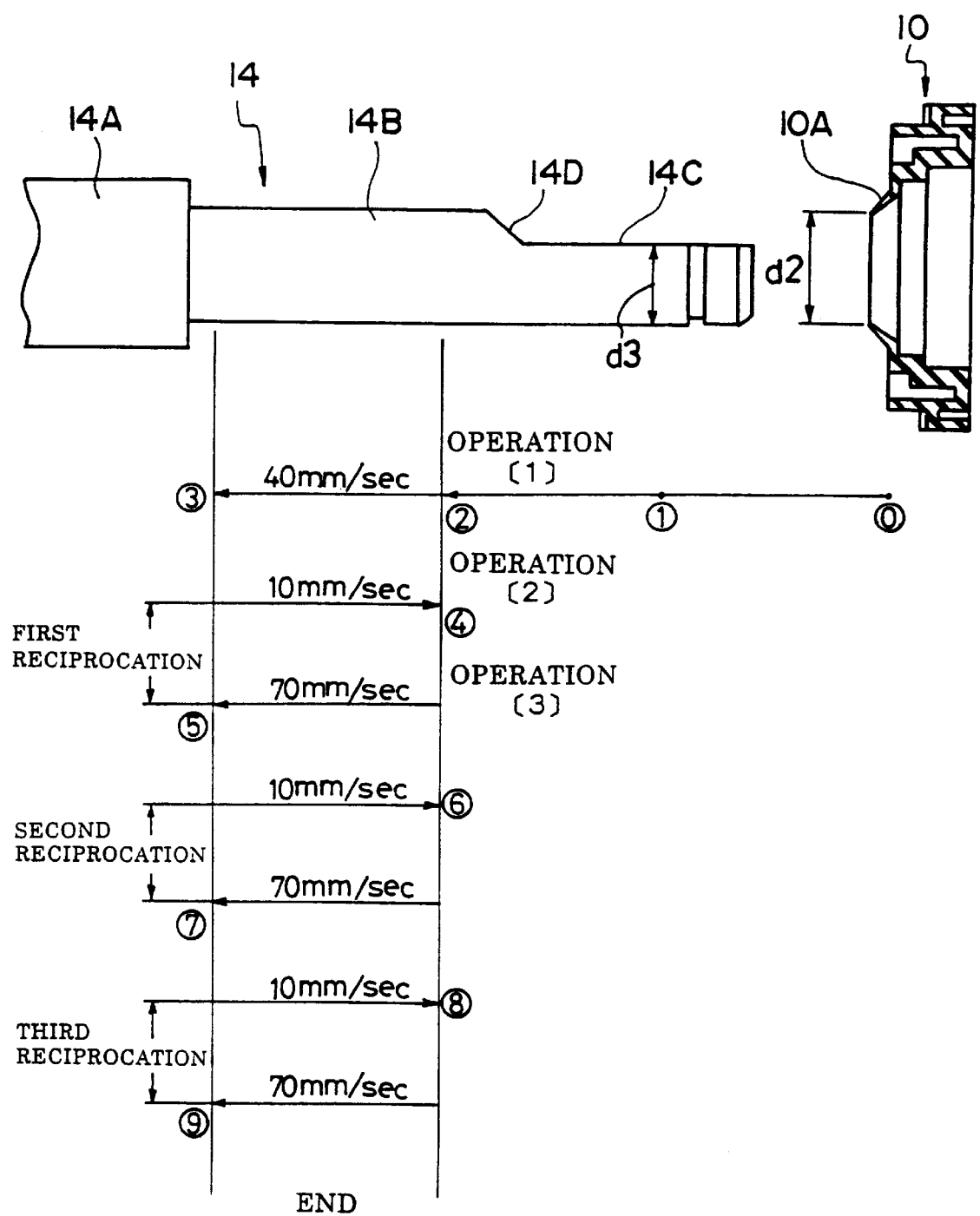
FIG. 16 is a conceptual diagram the operation example of seal insertion.

FIG. 16 shows the operation example as the seal 10 is inserted onto the shaft 14 with a configuration such as that shown in FIG. 13. Of course, assume that when the seal 10 is inserted onto the shaft 10, the lip 10A has been directed in the direction into which the seal 10 is inserted on the shaft 14.

First, the seal 10 is moved from position 0 shown in FIG. 16 to position 1 at an appropriate speed, and the seal 10 is inserted from the D-cutout portion 14C of the shaft 14 on the cylindrical axial portion 14B. Then, between position 2 and position 3, the seal 10 is advanced at a first speed (e.g., 40 mm/s). Note that the position 3 needs to be a position at which the seal 10 does not contact the end face of the large-diameter portion 14A of the shaft 14. At this time, there is a high possibility that the lip 10A of the seal 10 will be completely turned over. Thereafter, the seal 10 is pulled back from the position 3 to position 4 at a second speed (e.g., 10 mm/as). Furthermore, the seal 10 is again inserted from the position 4 to position 5 at a third position (e.g., 70 mm/s). Preferably, among the aforementioned operations, the operations at the second and third speeds is performed once or a plurality of times (thrice in the figure) and, at the time of the last insertion, the seal 10 is positioned at a predetermined insertion position.

Generally, in the aforementioned operations, the pull-out operations from position 3 to position 4, position 5 to position 6, and from position 7 to position 8 are an operation of pulling out the seal 10 from the shaft 14, but they are also an operation of correcting the turnover of the lip 10A. Therefore, if this pull-out distance is longer, the turnover of the lip 10A will be corrected more easily. The movements from position 2 to position 3, position 4 to position 5, and from position 6 to position 7 are an operation of inserting the seal 10 onto the shaft 10, but they are also a direction in which the lip 10A is easily turned over. Therefore, if this distance is shorter, the lip 10A will be more difficult to be turned over.

Thus, from the aforementioned two conditions the condition in which the lip 10A is difficult to be turned over is that distance to be inserted is short and distance to be pulled out is long. However, these two conditions conflict with each other, so they cannot be satisfied at the same time. Hence, as described above, the inserting speed and the pullout speed are changed. That is, the inserting speed is made fast so that turnover is difficult to occur, and the pull-out speed is made slow so that turnover is easily corrected.

Note that if a shaft onto which a seal is inserted has difference in level such as the D-cutout portion 14C of the shaft 14, turnover will occur in the lip 10A, so the pull-out operation will be performed within the cylindrical portion (axial portion 14B) of the shaft as shown in FIG. 16.

At the time of insertion from position 4 to position 5, position 6 to position 7, and from position 8 to position 9, if relative rotation is attempted to be applied between the seal 10 and the shaft 14, the frictional force which occurs between the lip 10A and the shaft 14 will occur not in the direction of insertion but also in the rotational direction of the shaft 14 and the friction force in the insertion direction will be dispersed. As a consequence, the lip 10A is difficult to be turned over at the time of insertion.

Incidentally, when the aforementioned is normally performed, even in the case where the seal 10 and the shaft 14 are offset from each other in the radial direction of the shaft 14 when the seal 10 and the shaft 14 contact each other, such offset can be corrected if the correction mechanism 45 is provided as shown in FIGS. 9 through 12. The same also holds at the time of abnormality, that is, at the time of hand jam.

In the case where the chuck handle 12 has structure shown in FIGS. 7 through 10, if a strong force is applied to the chuck 39 in a direction in which the chuck 39 is pushed, the movable base 38 will contract the spring 44 through the load cell 31. If a further strong force is applied to the chuck 39, the jam detection dog 41 will cross over the jam sensor 42 and the information will be transferred to the robot controller 34. The robot controller 34 will stop the robot 13 as a state of emergency.

In the case where the chuck handle 12" has structure shown in FIGS. 11 and 12, even if force were applied to the chuck 39 in the direction in which the chuck is pushed, no portion would move in the axial direction of the seal 10 until a certain force is applied. If the force for pushing the chuck 39 becomes stronger, the movable base 38 will push the shaft 49 of the air cylinder 48 through the load cell 31 and the shaft 49 will move. Then, if the shaft 49 comes to the position of the sensor 50, it will be detected by the sensor 50 and the information will be transferred to the robot controller 34. The robot controller 34 will stop the robot 13 as a state of emergency.

Now, a description will be given of a turnover judgment method for judging whether or not turnover has occurred on the lip 10A when the seal 10 was inserted on the shaft 14. As a turnover judgment method, a description will be made of a first turnover judgment method shown in FIG. 17, a second turnover judgment method shown in FIG. 18, a third turnover judgment method shown in FIG. 19, and a fourth turnover judgment method shown in FIG. 20.

(First Turnover Judgment Method)

Figure 17:
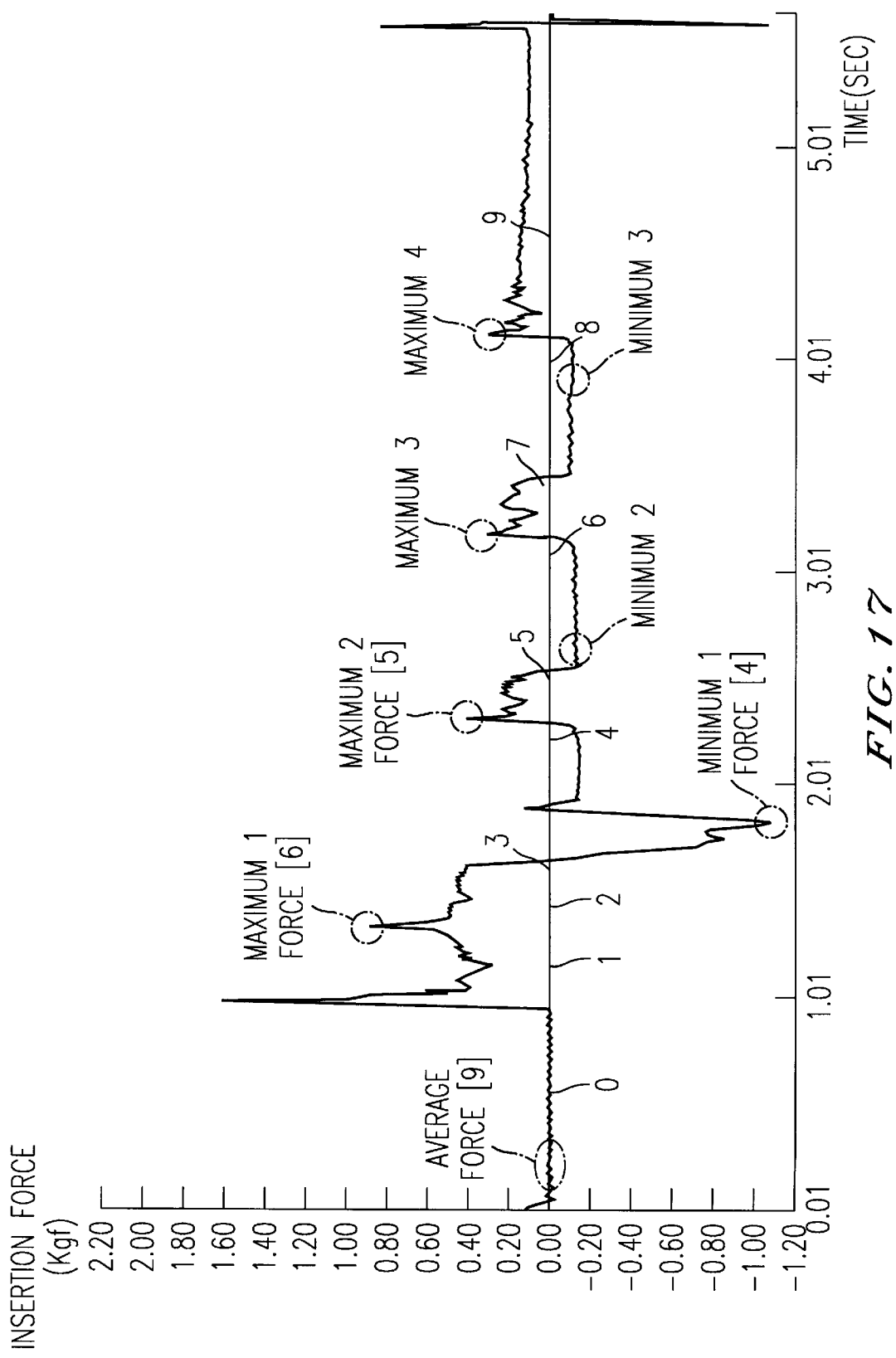
FIG. 17 is a diagram for explaining a first method of judging the turnover of a lip.

During an operation of seal insertion, voltage proportional to load applied to the load cell 31 is output from the load cell 31 and is amplified by the load cell amplifier 32. The waveform of the load becomes as shown in FIG. 17. In the figure, the axis of ordinate represents insertion force or pull-out force (kgf) and the axis of abscissa represents time (s). Also, the numbers 0 through 9 in the waveform correspond to the positions 0 through 9 shown in FIG. 16, respectively.

The computer 33 computes average force by averaging some forces before the seal 10 makes contact with the shaft 14 (average force 9: the following maximum value or minimum value represents a value obtained by subtracting average force 9 from a measured value). Now, the maximum value of the insertion force between position 1 of FIG. 16 and position 3 is taken to be maximum 1 and the minimum value of the pull-out force between position 3 and position 4 is taken to be minimum 1. The maximum and minimum values at the time of reciprocation thereafter are taken to be maximum 2, maximum 3, maximum 4, minimum 2, and minimum 3, respectively.

(1) Case of judging with insertion force or pull-out force alone:

When the absolute value of the minimum pull-out force (minimum 3) at the time of the last pull-out operation is greater than a predetermined value, it is judged that the turnover of the lip 10A has not been corrected. Even if the seal were inserted as it is, the turnover of the lip 10A would never be corrected. Also, when the maximum insertion force (minimum 4) at the time of the last insertion operation is greater than a predetermined value, it is judged that the lip 10A has been turned over.

(2) Case of judging with a ratio between insertion force and pull-out force:

A ratio between the absolute values of the maximum insertion force (maximum 1) obtained at the time of the first insertion and the minimum pull-out force (minimum 3) obtained at the time of the last pull-out operation is computed. When the ratio between the absolutes is less than a predetermined value, it is judged that the turnover of the lip 10A has not been corrected. Even if the seal were inserted as it is, the turnover of the lip 10A would never be corrected. Also, a ratio between the maximum insertion force (maximum 1) obtained at the time of the first insertion and the maximum insertion force (maximum 4) obtained at the time of the last insertion is computed. When this ratio is less than a predetermined value, it is judged that the lip 10A has been turned over.

In the aforementioned (1) and (2), when it is judged that the lip 10A has been turned over, the computer 33 sends the robot controller 34 an alarm signal indicating that the lip 10A has been turned over, stops movement of the robot 13, and produces alarm sound.

(Second Turnover Judgment Method)

Figure 18:
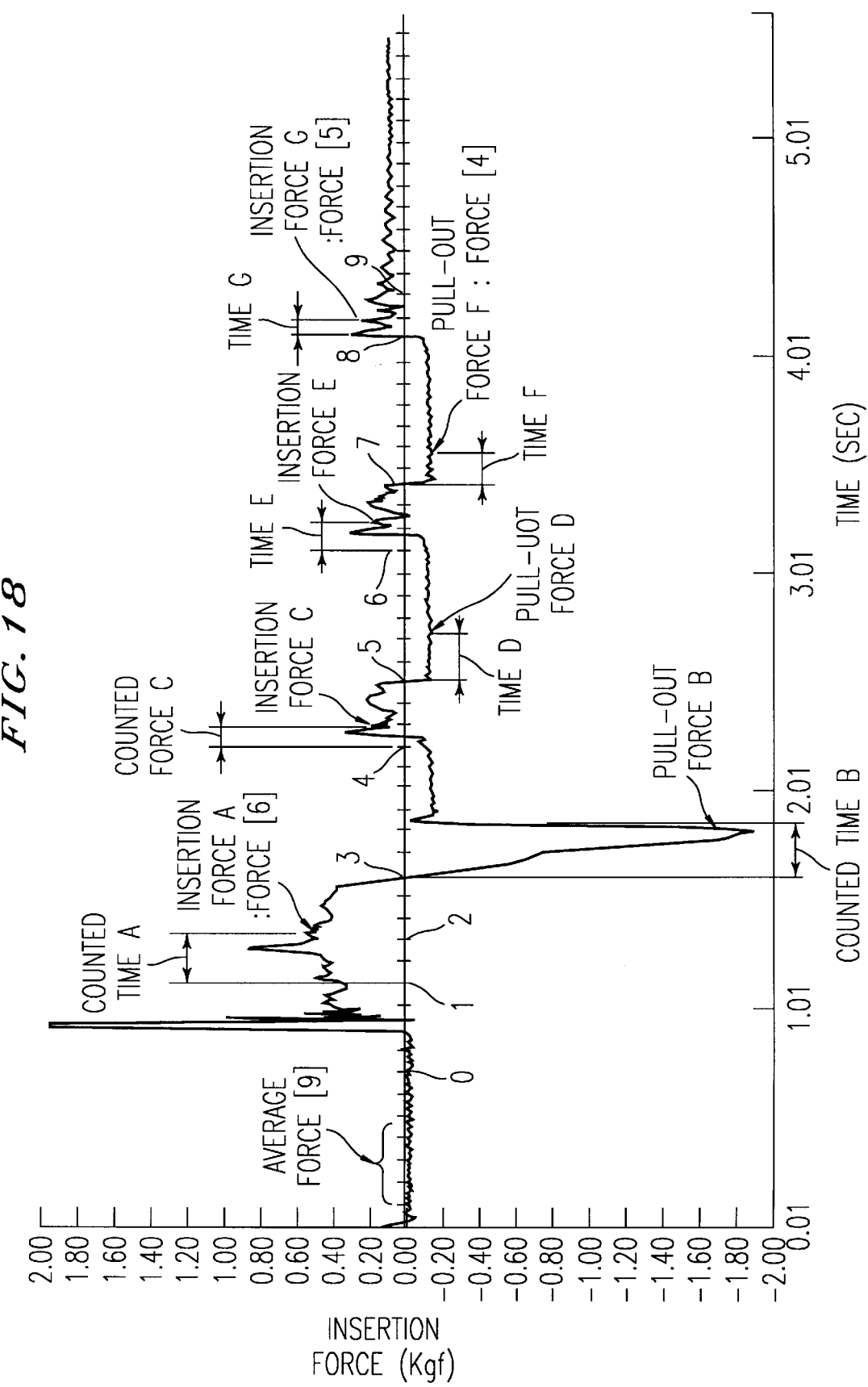
FIG. 18 is a diagram for explaining a second method of judging the turnover of a lip.

If unexpected noise is added to a voltage signal from the load cell 31, a voltage different from an original value will be input to the computer 33. If the input value is the maximum value, it will be used in judging the turnover of the lip 10A and result in an error in the turnover judgment. In order to prevent this error, the turnover judgment is performed as shown in FIG. 18.

In the figure, as with FIG. 17, the axis of ordinate represents insertion force or pull-out force (kgf) and the axis of abscissa represents time (s). Also, the numbers 0 through 9 in the waveform correspond to the positions 0 through 9 shown in FIG. 16, respectively.

The computer 33 averages some forces before the seal 10 makes contact with the shaft 14 (average force 9: the following maximum value or minimum value represents a value obtained by subtracting average force 9 from a measured value). Now, the insertion force after a fixed time (counted fixed time A) has elapsed from the position 1 at which the insertion operation is started by the contact of the seal 10 with the shaft 14 is taken to be insertion force A, and the pull-out force after a fixed time (counted fixed time B) has elapsed from the start position 3 of the pull-out operation is taken to be pull-out force B. The insertion forces after fixed times C, E, and G have elapsed from the start position of the insertion operation thereafter are taken to be insertion forces C, E, and G, respectively. The insertion forces after fixed times D and F have elapsed from the start position of the insertion operation are taken to be insertion forces D and F, respectively.

(1) Case of judging with insertion force or pull-out force alone:

When the absolute value of the pull-out force (pull-out force F) at the time of the last pull-out operation is greater than a predetermined value, it is judged that the turnover of the lip 10A has not been corrected Also, when the insertion force (insertion force G) at the time of the last insertion operation is greater than a predetermined value, it is judged that the lip 10A has been turned over.

(2) Case of judging with a ratio between insertion force and pull-out force:

A ratio between the absolute values of the insertion force (insertion force A) obtained at the time of the first insertion and the pull-out force (pull-out force F) obtained at the time of the last pull-out operation is computed. When the ratio between the absolutes is less than a predetermined value, it is judged that the turnover of the lip 10A has not been corrected. Also, a ratio between the insertion force (insertion force A) obtained at the time of the first insertion and the insertion force (insertion force G) obtained at the time of the last insertion is computed. When this ratio is less than a predetermined value, it is judged that the lip 10A has been turned over.

In the aforementioned (1) and (2), when it is judged that the lip 10A has been turned over, the computer 33 sends the robot controller 34 an alarm signal indicating that the lip 10A has been turned over, stops movement of the robot 13, and produces alarm sound.

(Third Turnover Judgment Method)

Figure 19:
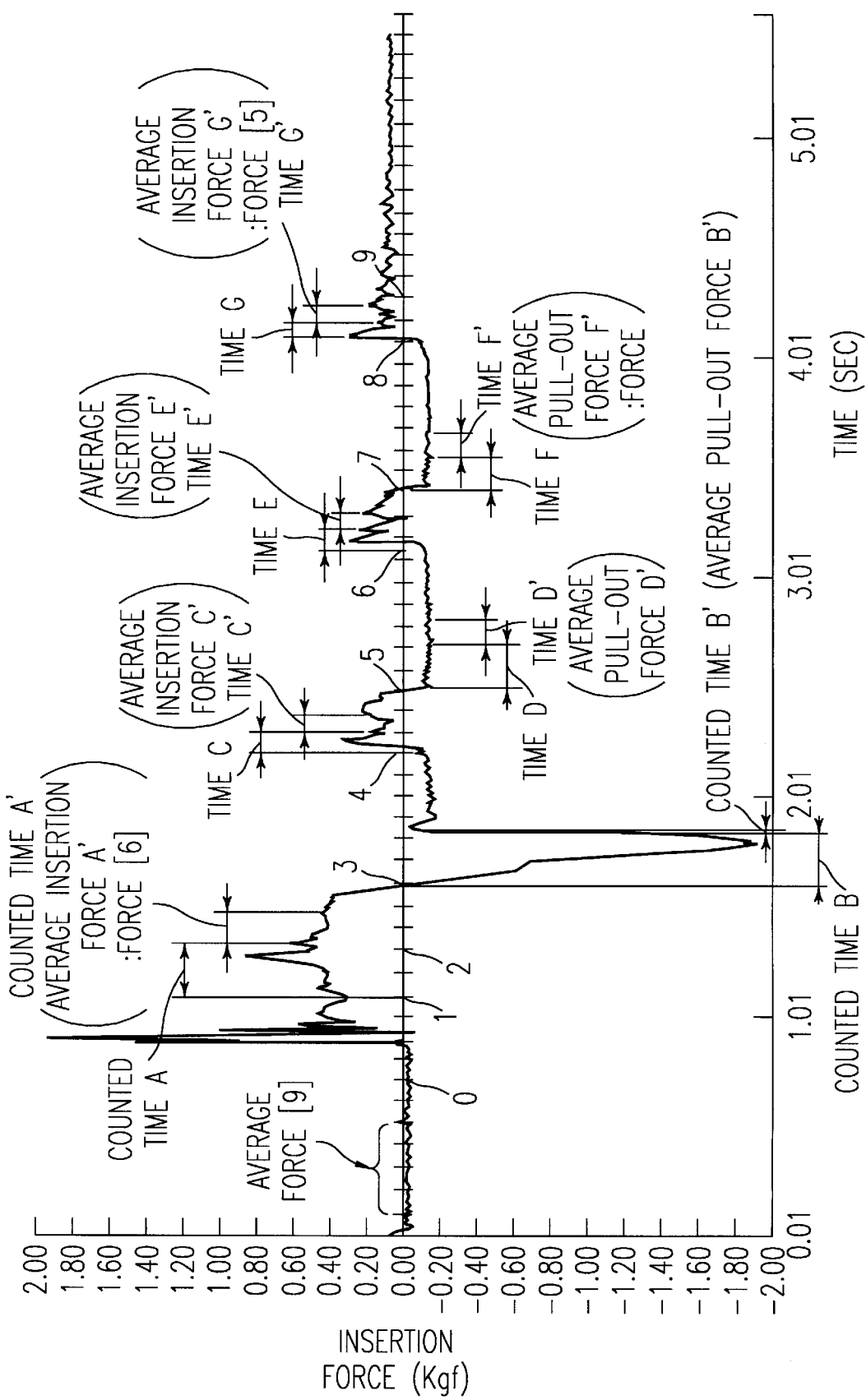
FIG. 19 is a diagram for explaining a third method of judging the turnover of a lip.

In FIG. 18, while the turnover judgment for the lip 10A has been performed with the insertion force or pull-out force after a fixed time, only a single insertion force and only a single pull-out force are employed. More specifically, the turnover judgment has been performed by employing only a single insertion force A at the time of the first insertion, only a single pull-out force F at the time of the last pull-out operation, and only a single pull-out force G at the last pull-out operation. However, if the turnover judgment is performed with only a single insertion force or pull-out force, there will be the possibility that even small noise will cause an error in the turnover judgment. In order to prevent this, the turnover judgment is performed as shown in FIG. 19.

In the figure, as with FIG. 17 or 18, the axis of ordinate represents insertion force or pull-out force (kgf) and the axis of abscissa represents time (s). In this turnover judgment method, after a fixed time (counted time A) has elapsed from the position 1 at which an insertion operation is started by the contact of the seal 10 with the shaft 14, insertion force is measured over a predetermined time (counted time A'). Also, after a fixed time (counted time B) has elapsed from the start position 3 of the pull-out operation, pull-out force is measured over a predetermined time (counted time B'). In the same way, after a fixed time C from the start position of the insertion operation, insertion force is measured over counted time C'. After a fixed time E from the start position of the insertion operation, insertion force is measured over counted time E'. After a fixed time G from the start position of the insertion operation, insertion force is measured over counted time G'. After a fixed time D from the start position of the pull-out operation, pull-out force is measured over counted time D'. Finally, after a fixed time F from the start position of the pull-out operation, pull-out force is measured over counted time F'.

Then, an average value (average insertion force A') of insertion forces measured a plurality of times over counted time A' is computed. Similarly, average values (average pull-out forces B', D', and F') of pull-out forces measured a plurality of times over counted times B', D', and F' are computed and average values (average insertion forces C', E', and D') of insertion forces measured a plurality of times over counted times C', E', and G' are computed.

(1) Case of judging with insertion force or pull-out force alone:

When the absolute value of the average value (average pull-out force F') of the pull-out forces at the time of the last pull-out operation is greater than a predetermined value, it is judged that the turnover of the lip 10A has not been corrected. Also, when the average value (average insertion force G') of the insertion forces at the time of the last insertion is greater than a predetermined value, it is judged that the lip 10A has been turned over.

(2) Case of judging with a ratio between insertion force and pull-out force:

A ratio between the absolute values of the average value (average insertion force A') of insertion forces obtained at the time of the first insertion and the average value (average pull-out force F') of the pull-out forces obtained at the time of the last pull-out operation is computed. When the ratio between the absolutes is less than a predetermined value, it is judged that the turnover of the lip 10A has not been corrected. Also, a ratio between the absolute values of the average value (average insertion force A') of insertion forces obtained at the time of the first insertion and the average value (average insertion force G') of the insertion forces obtained at the time of the last pull-out operation is computed. When this ratio is less than a predetermined value, it is judged that the lip 10A has been turned over.

In the aforementioned (1) and (2), when it is judged that the lip 10A has been turned over, the computer 33 sends the robot controller 34 an alarm signal indicating that the lip 10A has been turned over, stops movement of the robot 13, and produces alarm sound.

(Fourth Turnover Judgment Method)

In the case where the seal 10 is rotated and inserted onto the shaft 14, the turnover of the lip 10A can be judged based on the insertion force detected when the insertion operation is performed.

Figure 20:
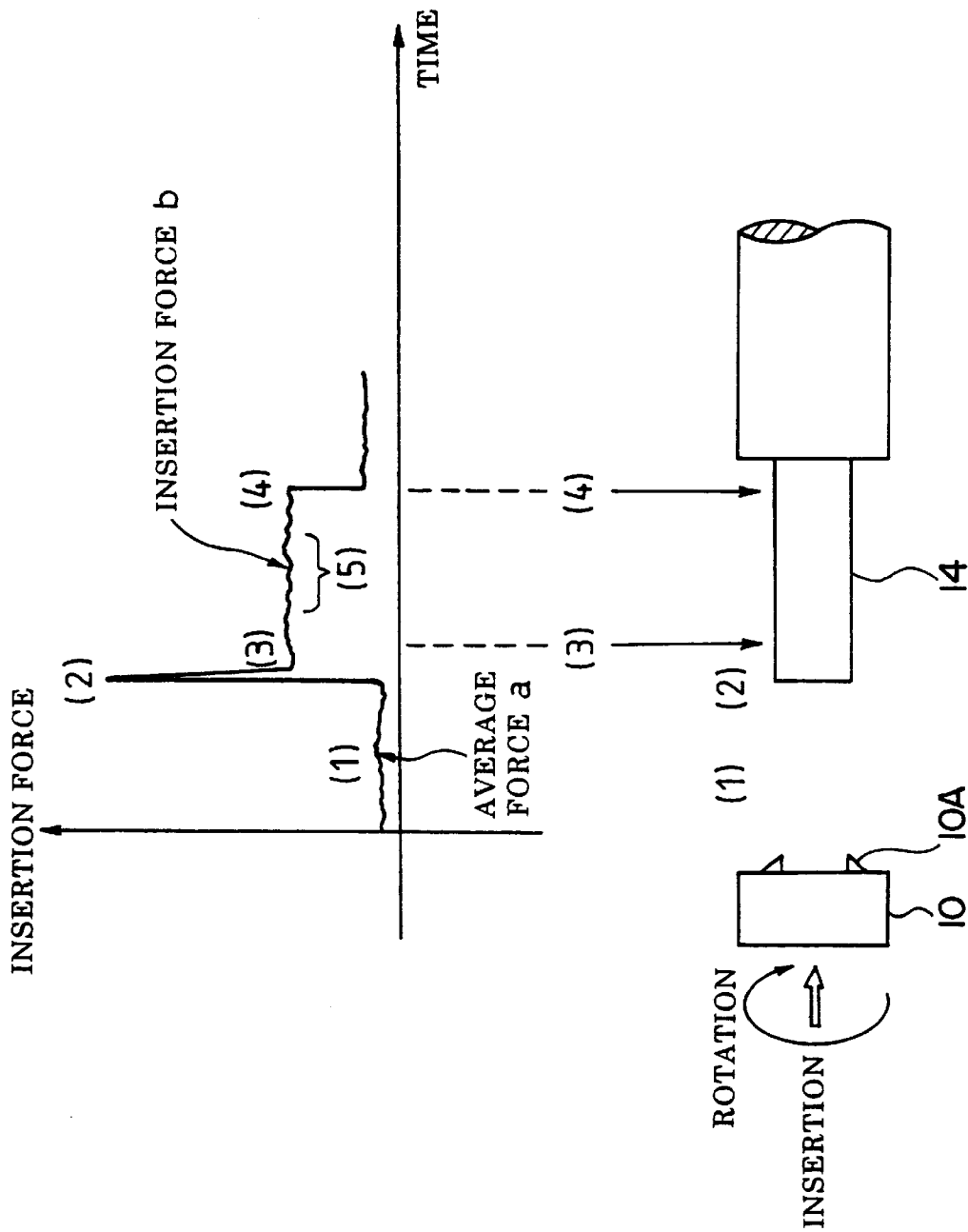
FIG. 20 is a diagram for explaining a fourth method of judging the turnover of a lip.

FIG. 20 shows the fluctuation in the insertion force detected when the seal 10 is inserted onto the shaft 14. The computer 33 computes average force by averaging some forces before the seal 10 makes contact with the shaft 14, that is, when the seal 10 is at position (1) (average force (a): the following insertion force represents a value obtained by subtracting average force (a) from a measured value). In the figure, reference numeral (2) represents an instantaneous position at which the seal 10 is inserted on the shaft 14. Reference numeral (3) represents a position at which the seal 10 is rotated and inserted, and (4) represents a position at which the rotation of the seal 10 is stopped and the insertion is completed. Between positions (3) and (4), the seal 10 is rotated and inserted.

The detection of insertion force is performed in the rotation insertion range between positions (3) and (4), but it is usually performed in a range (5) where the waveform of insertion force is stabilized. When insertion force (b) detected is greater than a predetermined value, it is judged that the lip 10A has been turned over. In this case, in the case where the data of the detected insertion force is only one, when noise gets into the data, there is the possibility that the turnover judgment will be inaccurately performed. For this reason, insertion force preferably is detected a plurality of times in the aforementioned range (5) to compute an average value, and based on the average value, the turnover of the lip 10A is judged.

In FIG. 20, while the seal 10 has been rotated, the shaft 14 may be rotated instead of rotating the seal 10. In addition, both the seal 10 and the shaft 14 may be rotated. In the case where both of them are rotated, they are preferable to be rotated in directions opposite to each other.

(Fifth Turnover Judgment Method)

When the seal 10 is inserted onto the shaft 14, fluctuation occurs in insertion time, depending on a work piece. For this reason, there are cases where fluctuation will occur in the time A counted from position 1, shown in FIGS. 18 and 19.

Therefore, in a fifth turnover judgment method according to the present invention, insertion force is measured during a first operation in which the seal 10 is inserted once on the shaft 14, and the waveform of the insertion force is detected from the measurement result. The insertion force waveform during the first operation shows a remarkable transient waveform whose amplitude rises sharply as shown in FIG. 18 or 19, because the lip 10A of the seal 10 makes contact with the point end of the shaft 14 when the seal 10 moves from position 0 to position 1. In the insertion operation, if the seal 10 moves further from position 1 to position 2, the lip 10A of the seal 10 will contact the stepped portion (inclined surface 14D) between the D-cutout portion 14C and the axial portion 14B. Likewise, the amplitude of the waveform rises sharply and a similar transient waveform is observed. At this stage, a portion of the lip 10A is turned over. If the seal 10 reaches position 3, the insertion operation of the seal 10 will be shifted to the pull-out operation of the seal 10 and therefore the insertion force waveform will be changed from a positive sign to a negative sign. When the seal 10 reaches position 3, the nearly entire circumference of the lip 10A is turned over.

The insertion force waveform usually shows the aforementioned behavior. Therefore, if the transient state of the insertion force waveform is observed, the relative position between the shaft 14 and the seal 10 can be estimated. At the estimated position, insertion force is detected. If the value of the detection result is greater than a predetermined value, it can be judged that the lip 10A has been turned over. If alone in this way, an error of measurement will be reduced for each work piece and an accurate judgment of turnover can be performed.

The predetermined value, which is compared when judging insertion force, is determined based on data obtained by experiment. However, there is the possibility that insertion force will occur outside a range of data obtained during experiment, and in such a case, judgment will not be able to be guaranteed.

Hence, in the fifth turnover judgment method of the present invention, the insertion force at the position estimated from the insertion force waveform is used in a preliminary judgment of whether or not the turnover judgment of the lip portion is possible. If done in this way, the insertion force outside a range of data obtained during experiment will be excluded from judgment and therefore turnover judgment accuracy can be further enhanced.

Figure 21:
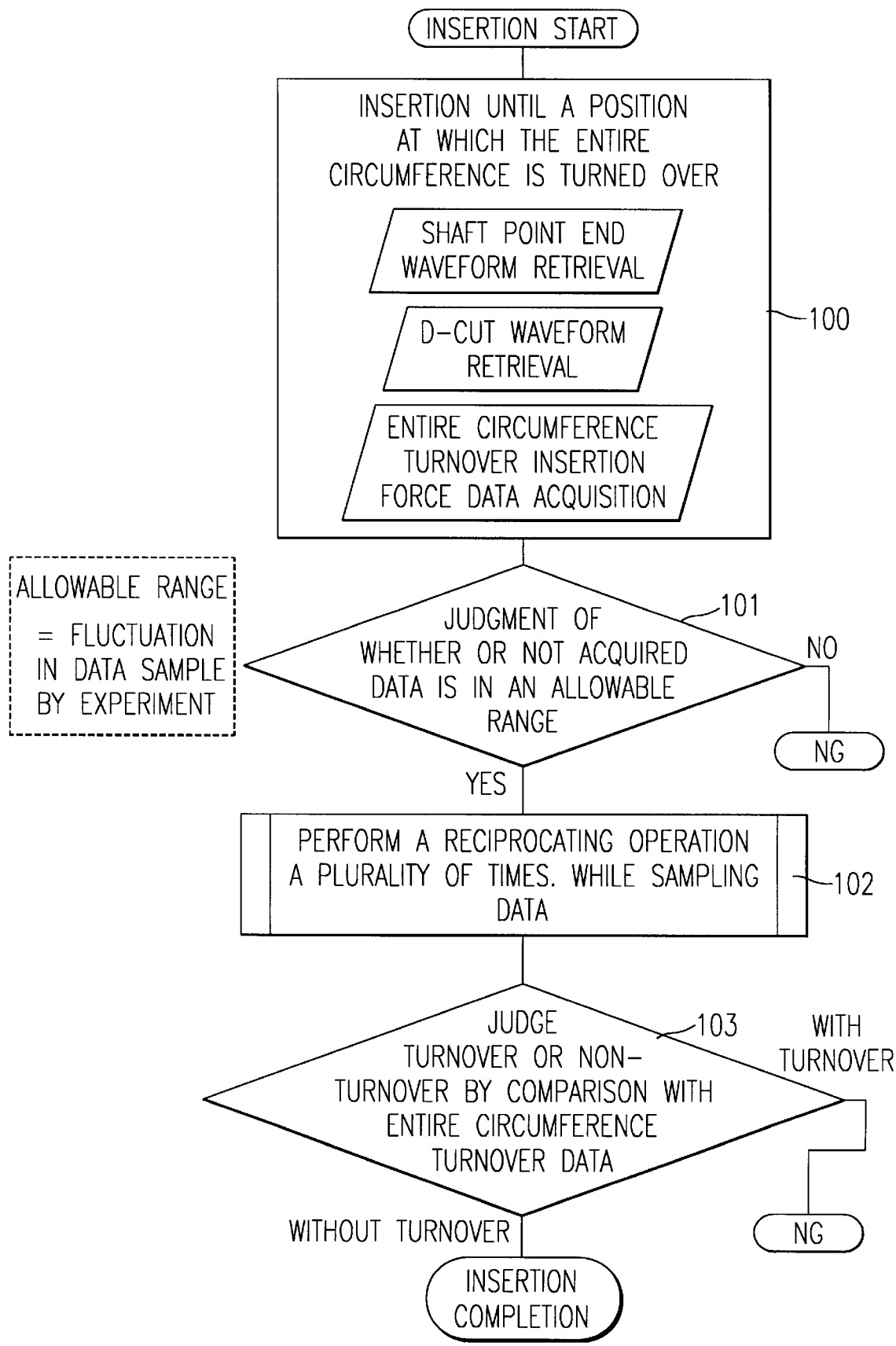
FIG. 21 is a flowchart for explaining a fifth method of judging the turnover of a lip.

A flowchart of the fifth turnover judgment method is shown in FIG. 21. In the figure, steps 100 and 101 are performed by the fifth turnover judgment method and steps 102 and 103 are performed by the aforementioned first, second, or third turnover judgment method.

Incidentally, when the seal 10 is inserted onto the shaft 14, the lip 10A is easily turned over even at the end of the shaft 14. To prevent this, as shown in FIG. 14, a taper portion 14E is formed on the end of the shaft 14 and the diameter d1 of the end face of the taper portion 14E is formed so as to be smaller than the inner diameter d2 (FIG. 16) of the lip 10A of the seal 10. If constructed like this, the turnover of the lip 10A can be prevented, even if the lip 10A struck on the taper portion 14E, when inserting the seal 10 onto the shaft 14.

In order to prevent turnover from occurring in the lip 10A when the seal 10 moves along the D-cutout portion 14C (i.e., position 1 of FIG. 16 to position 2), the relation between the length d3 in the diameter direction of the D-cutout portion 14C and the inner diameter d2 of the lip 10A of the seal 10 needs to be set as follows:

$$d3 \leq d2$$

When the lip 10A has been turned over, the turnover is returned to the original state by the following returning method. The returning method will hereinafter be described.

(Method utilizing a D-cutout portion)

In the case where the shaft 14 is provided with the D-cutout portion 14C, if the seal 10 is positioned within the D-cutout portion 14C, as shown in FIG. 22, the turnover of the lip 10A will return to the original state by the stepped portion between the axial portion 14B and the D-cutout portion 14C. In the figure, the portion where the turnover of the lip 10A has returned is represented by 10A' and the portion where the turnover has not returned is represented by 10A".

In the D-cutout portion 14C, the length d3 in the diameter direction is shorter than the inner diameter d2 of the lip 10A, as previously described. The shaft 14 formed with the D-cutout portion 14C is shown in FIG. 23. FIG. 23(A) is a front view of the shaft 14 and FIG. 23(B) is a cross sectional view of the D-cutout portion 14 taken substantially along line B—B of FIG. 23(A).

As shown in FIG. 22, in the state where the seal 10 is positioned within the D-cutout portion 14C, if the shaft 14 is rotated, the turnover of the lip 10A will be returned by the rotation of the D-cutout portion 14C, and the turnover of the entire circumference will be returned if the shaft 14 makes about one revolution. To reliably return the turnover of the lip 10A, the rotational quantity of the shaft 14 is preferable to be one revolution or more. The rotation of the shaft 14 may be performed in the state where the seal 10 does not move along the shaft 14 or while moving the seal 10 in the insertion direction or in the pull-out direction. After the turnover of the lip 10A has returned, the seal 10 is moved to a predetermined position on the axial portion 14B. With this, the seal 10 can be inserted on the shaft 14 in the state where there is no turnover over the entire circumference of the shaft 14.

When the seal 10 in which its turnover has returned is moved from the D-cutout portion 14C to the axial portion 14B, if there is a stepped portion between the D-cutout portion 14C and the axial portion 14B, there is the possibility that the lip 10A will strike on this stepped portion and will be turned over again. In this case, if the shaft 14 is rotated during movement, the lip 10A can be prevented from being turned over again. As shown in FIGS. 14 through 16, if an inclined surface 14D is formed on the stepped portion between the axial portion 14B and the D-cutout portion 14C, the lip 10A can be prevented from being caught on the stepped portion and being turned over when inserting the seal 10 from the D-cutout portion 14C onto the axial portion 14B.

Figure 24:
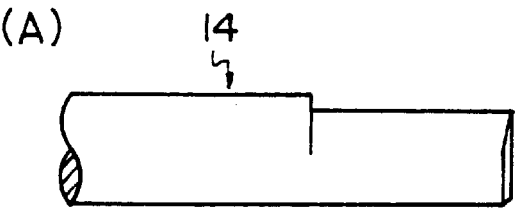
FIG. 24(A) is a front view of the shaft formed with a cutout portion having a cylinder-shaped convex surface.
FIG. 24(B) is a cross sectional view of the cutout portion shown in FIG. 24(A)
Figure 24:
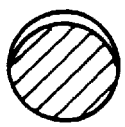
Figure 25:
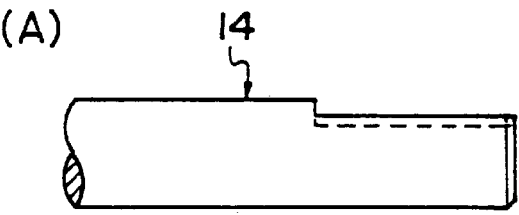
FIG. 25(A) is a front view of the shaft formed with a cutout portion having a cylinder-shaped concave surface.
FIG. 25(B) is a cross sectional view of the cutout portion shown in FIG. 25(A)
Figure 25:
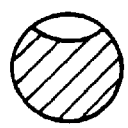
Figure 26:
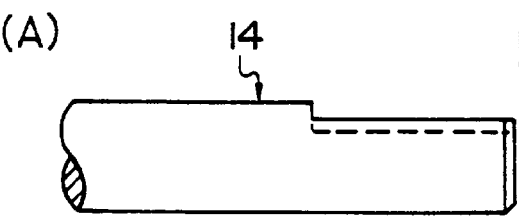
FIG. 26(A) is a front view of the shaft formed with a cutout portion having a groove.
FIG. 26(B) is a cross sectional view of the cutout portion shown in FIG. 26(A)
Figure 26:
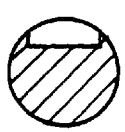
Figure 27:
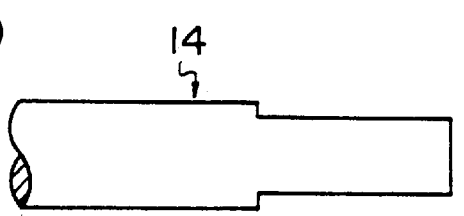
FIG. 27(A) is a front view of the shaft formed with cutout portions.
FIG. 27(B) is a cross sectional view of the cutout portions shown in FIG. 27(A)
Figure 27:
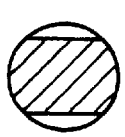
Figure 28:
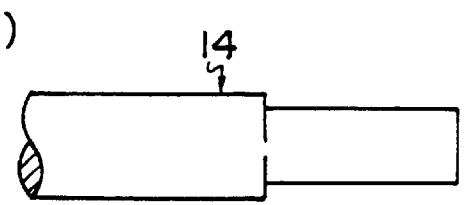
FIG. 28(A) is a front view of the shaft formed with cutout portions each having a cylinder-shaped convex surface.
FIG. 28(B) is a cross sectional view of the cutout portions shown in FIG. 28(A)
Figure 28:
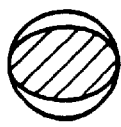

To return the turnover of the lip 10A, cutout portions, such as those shown in FIGS. 24 through 28, may also be formed on one end portion of the shaft 14. In the figures, (A) is a front view of the shaft 14 and (B) is a cross sectional view of the shaft 14 taken at the same position as FIG. 23. The cut surface of the D-cutout portion 14C shown in FIG. 23 is flat in shape. In FIG. 24 the cut surface forms a cylinder-shaped convex surface. In FIG. 25 the cut surface forms a cylinder-shaped concave surface. In FIG. 26 a groove is formed in the cut surface. In FIG. 27 flat cut surfaces are formed on both sides of the shaft 14. In FIG. 28 cylinder-shaped convex surfaces (which form an ellipse in cross section) are formed on both sides of the shaft 14.

Figure 29:
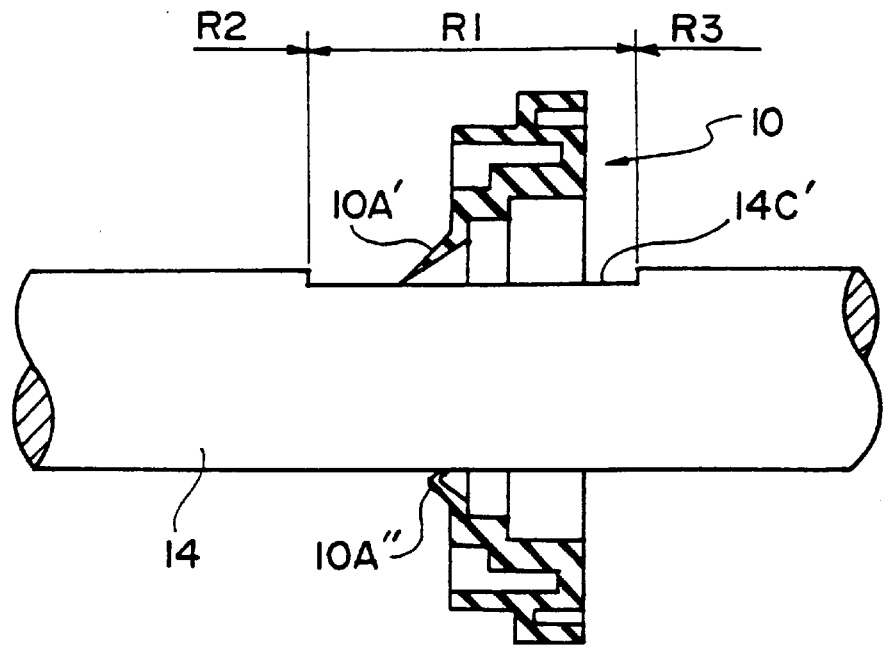
FIG. 29 is a sectional view used to explain a method of returning the turnover of the lip by utilizing a D-cutout portion provided in the longitudinal intermediate portion of the shaft.

In FIGS. 22 through 28, although the D-cutout portion 14C has been provided in one end portion of the shaft 14, a D-cutout portion 14C' may be provided in an intermediate portion of the shaft 14, as shown in FIG. 29. In this case, after the seal 10 has been positioned within the D-cutout portion 14C', the shaft 14 is rotated to return the turnover of the lip 10A of the seal 10. Furthermore, the cross sectional configuration of the D-cutout portion 14C' may be formed as shown in FIGS. 24 through 28.

In FIG. 29 the area of the D-cutout portion 14C' of the shaft 14 is taken to be R1. The area extending rearward from the area R1 is taken to be R2, and the area extending forward from the area R2 is taken to be R3. The lip 10A of the seal 10 can be returned by rotating the shaft 14 when the seal 10 is in the area R1. When the seal 10 in which the turnover of the lip 10A has returned is then inserted toward the area R2, there is the possibility that the lip 10A will be turned again at the boundary between the areas R1 and R2, as in the case of FIG. 22, because there is the stepped portion between the areas R1 and R2. Even in this case, the lip 10A can be prevented from being turned over again, by rotating the shaft 10 during movement.

In FIGS. 22 and 29, although the shaft 14 alone has been rotated when the seal 10 is within the D-cutout portion 14C or 14C', the seal 10 alone may be rotated without rotating the shaft 14. Furthermore, both the shaft 14 and the seal 10 may be rotated.

In order to rotate the shaft 14 alone, the aforementioned seal inserting apparatus shown in FIG. 1 or 2 is employed. When only the seal 10 is rotated, the aforementioned seal inserting apparatus shown in FIG. 3 is employed. In the case where the shaft 14 and the seal 10 are both rotated, the aforementioned seal inserting apparatus shown in FIG. 4 is employed. Note that when both the shaft 14 and the seal 10 are rotated, the rotational directions are preferably opposite to each other (Method utilizing a circumferential groove)

Figure 30:
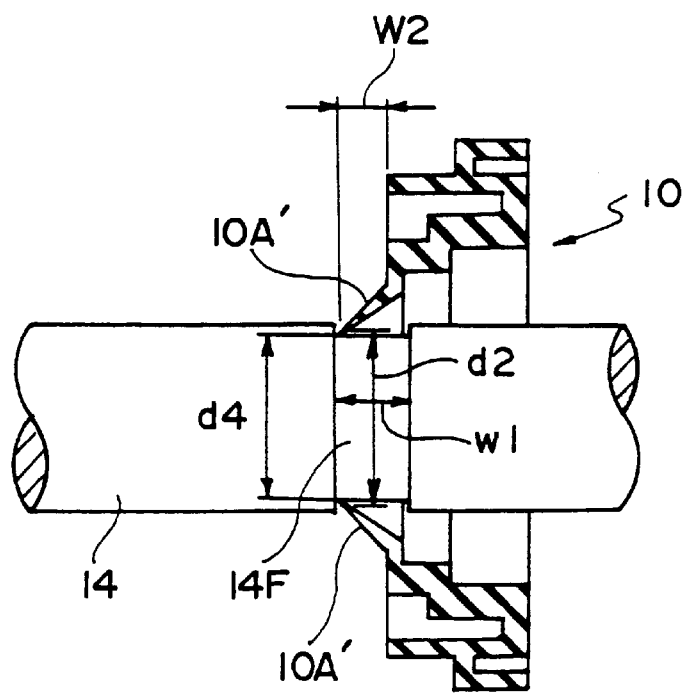
FIG. 30 is a sectional view used to explain a method of returning the turnover of the lip by utilizing a circumferential groove provided in the exterior surface of the shaft.

FIG. 30 shows a turnover returning method which utilizes a circumferential groove 14F provided in the exterior surface of the shaft 14. The groove width w1 of the circumferential groove 14F is greater than the protruded height w2 of the lip 10A, and the outer diameter of the bottom portion of the circumferential groove 14F is less than the inner diameter d2 of the lip 10A.

In the case where the circumferential groove 14F is provided in the aforementioned way, if the seal 10 is positioned within the circumferential groove 14F, the turnover of the lip 10A will return to the original state at the place of the circumferential groove 14F. If the turnover of the lip 10A does not return to the original state by placing the lip 10A within the circumferential groove 14F, the shaft 14 and the seal 10 will be rotated in directions opposite to each other in order to more reliably return the turnover.

In the circumferential groove 14F, although the cross sectional configuration of the shaft 14 is circular, it may be any shape if the circumferential groove 14F has a depth enough to return the turnover of the lip 10A. For example, the cross sectional configuration may be elliptic.

(Method utilizing a seal attaching member)

Figure 31:
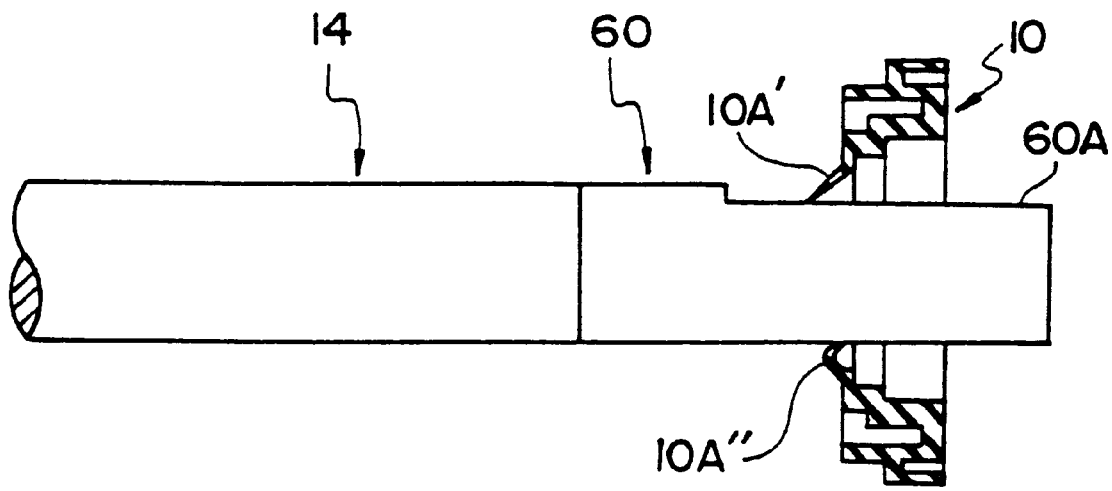
FIG. 31 is a sectional view used to explain a method of returning the turnover of the lip by utilizing a seal attaching member provided with a D-cutout portion.

FIG. 31 shows how the turnover of the seal 10 is returned with a seal attaching member 60 connected to the end face of the shaft 14 when the shaft 14 is not provided with a D-cutout portion or a circumferential groove. The seal attaching member 60 is provided with a D-cutout portion 60A at one end thereof. The seal attaching member 60 is coupled to the shaft 14 so that their axes are axially aligned with each other. When the lip 10A is turned over, the seal 10 is positioned on the D-cutout portion 60A and the seal attaching member 60 and the seal 10 are rotated in opposite directions, thereby returning the turnover of the lip 10A. Preferably, the seal attaching member 60 and the seal 10 are rotated one revolution or more.

Figure 32:
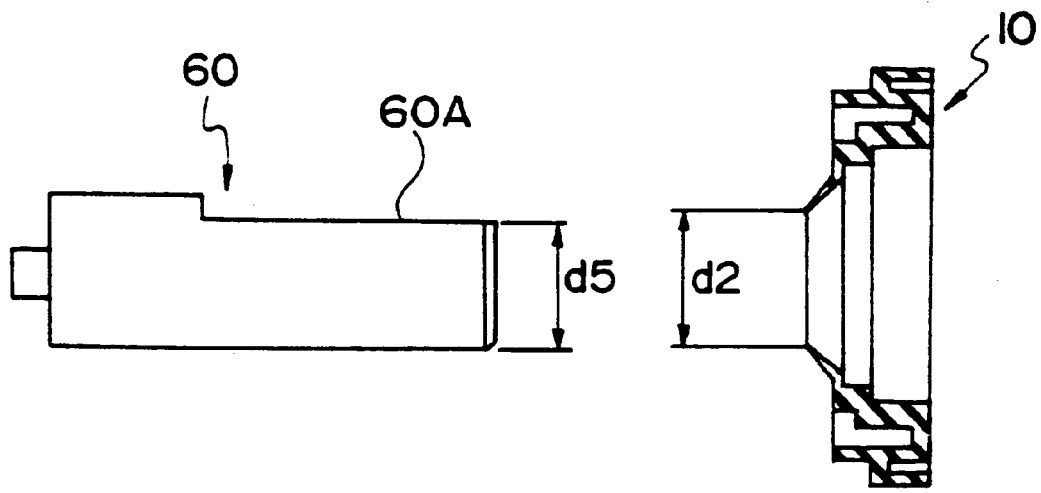
FIG. 32 is a diagram showing the relation between the D-cutout portion of the seal attaching member and the inner diameter of the lip.
Figure 34A:
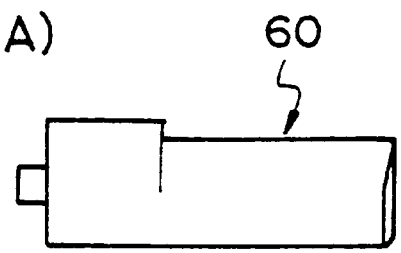
FIG. 34(A) is a front view of the seal attaching member formed with a cutout portion having a cylinder-shaped convex surface.
Figure 34B:
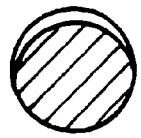
FIG. 34(B) is a cross sectional view of the cutout portion shown in FIG. 34(A)

In the seal attaching member 60, as shown in FIG. 32, the D-cutout portion 60A is formed so that the length d5 in the diameter direction thereof is less than the inner diameter d2 of the lip 10A.

As a method of coupling the seal attaching member 60 and the shaft 14 together, there are methods such as those shown in FIGS. 33(A) through 33(D). In FIG. 33(A) the seal attaching member 60 is provided with a square protrusion 60B at the end face thereof. The square protrusion 60B is fitted into a square hole 14G formed in the end face of the shaft 14 to connect the seal attaching member 60 and the seal 14 together. In FIG. 33(B) the seal attaching member 60 is provided with a cylindrical protrusion 60C at the end face thereof. The cylindrical protrusion 60C is fitted into a cylindrical hole 14H formed in the end face of the shaft 14 to connect the seal attaching member 60 and the seal 14 together.

In the case of FIG. 33(A), the square protrusion 60B and the square hole 14G having a square shape are fitted together. Therefore, if the shaft 14 is rotated, the rotational force can be reliably transmitted to the seal attaching member 60. However, in the case of FIG. 33(B), since the cylindrical protrusion 60C and the cylindrical hole 14H having a cylindrical shape are fitted together, slip will easily come to occur between the cylindrical protrusion 60C and the cylindrical hole 14H and there is the fear that the rotational force of the shaft 14 cannot be transmitted sufficiently to the seal attaching member 60. In such a case, if the shaft 14, for example, is constituted with magnetic material such as iron and if a magnet 60D is attached to the end portion of the seal attaching member 60, as shown in FIG. 33(C), the occurrence of slip can be suppressed between the shaft 14 and the seal attaching member 60. Furthermore, as shown in FIG. 33(D), the magnet 60D alone may be attached to the end portion of the seal attaching member 60. This method is suitable to the case where the shaft 14 and the end face of the seal attaching member 60 cannot be processed.

If the seal attaching member 60 has been constructed with magnetic material such as iron, a magnet can be previously attached to the end portion of the shaft 14. Also, magnets may be previously attached to the end portions of the shaft 14 and the seal attaching member 60, respectively.

Figure 35A:
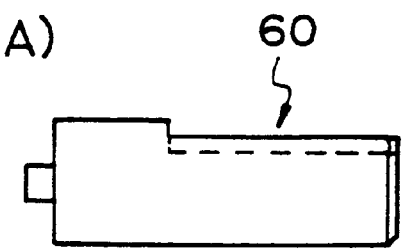
FIG. 35(A) is a front view of the seal attaching member formed with a cutout portion having a cylinder-shaped concave surface.
Figure 35B:
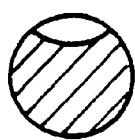
FIG. 35(B) is a cross sectional view of the cutout portion shown in FIG. 35(A)
Figure 36A:
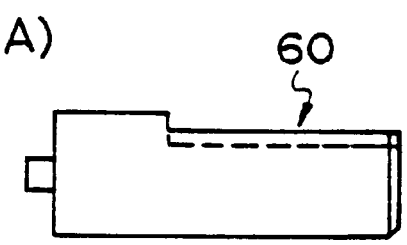
FIG. 36(A) is a front view of the seal attaching member formed with a cutout portion having a groove.
Figure 36B:
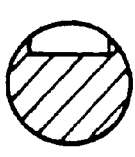
FIG. 36(B) is a cross sectional view of the cutout portion shown in FIG. 36(A)
Figure 37A:
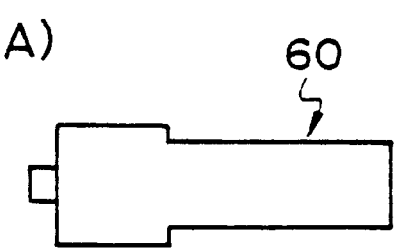
FIG. 37(A) is a front view of the seal attaching member formed with cutout portions.
Figure 37B:
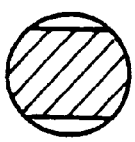
FIG. 37(B) is a cross sectional view of the cutout portions shown in FIG. 37(A)
Figure 38A:
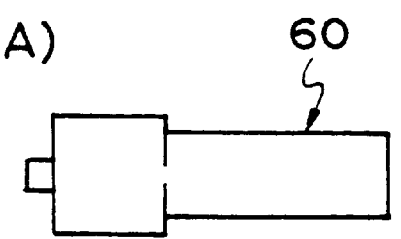
FIG. 38(A) is a front view of the seal attaching member formed with cutout portions each having a cylinder-shaped convex surface.
Figure 38B:
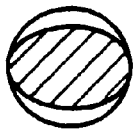
FIG. 38(B) is a cross sectional view of the cutout portions shown in FIG. 38(A)

One end portion of the seal attaching member 60 can be provided with a cutout portion having a shape such as those shown in FIGS. 34 through 38 instead of the D-cutout portion 14C. In the figures, (A) is a front view of the seal attaching member 60 and (B) is a cross sectional view of the seal attaching member 60 at the cutout portion. Although the cut surface of the D-cutout portion 60A is flat as shown in FIG. 33, the cut surface in FIG. 34 forms a cylinder-shaped convex surface. In FIG. 35 the cut surface is a cylinder-shaped concave surface. In FIG. 36 a groove is formed in the cut surface. In FIG. 37 flat cut surfaces are formed on both sides of the seal attaching member 60. In FIG. 38 cylinder-shaped convex surfaces (which form an ellipse in cross section) are formed on both sides of the seal attaching member 60.

The D-cutout portion or each of the cutout portions shown in FIGS. 34 through 38 can also be provided in a longitudinal intermediate portion of the seal attaching member 60.

Figure 39:
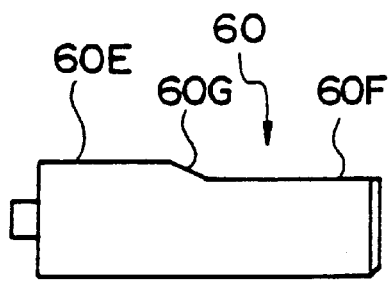
FIG. 39 is a front view showing a seal attaching member where an inclined surface is formed on a stepped portion.

When the seal 10 in which its turnover has returned is moved from the seal attaching member 60 to the axial portion 14B, if there is a stepped portion between the cylindrical portion of the seal attaching member 60 (near the shaft 14) and the cutout portion (e.g., D-cutout portion 60A), there is the fear that the lip 10A will be caught on this stepped portion and will be turned over again. In this case, if the seal attaching member 60 and the shaft 14 are rotated in opposite directions during movement of the shaft 14, the lip 10A can be prevented from being turned over again. As shown in FIG. 39, if an inclined surface 14D is formed on the stepped portion between the cylindrical portion 60E of the seal attaching member 60 and the D-cutout portion 60F, the lip 10A can be prevented from being caught on the stepped portion and being turned over.

Figure 40:
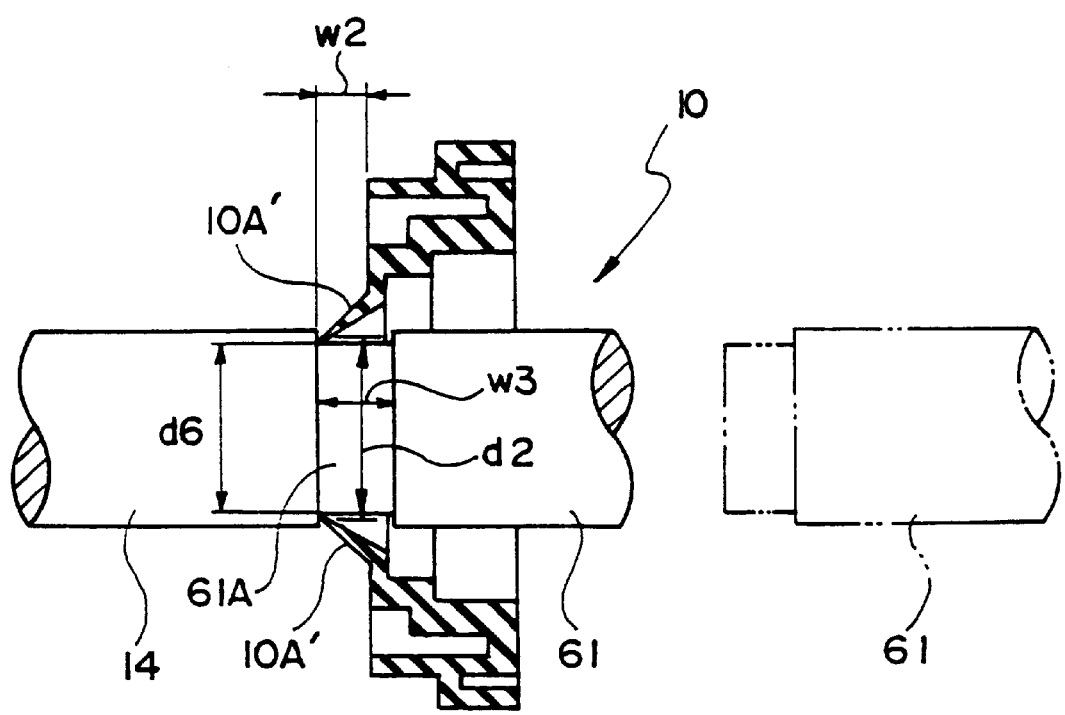
FIG. 40 is a sectional view used to explain a method of returning the turnover of the lip by utilizing a circumferential groove provided in a seal attaching member.

Even when a seal attaching member 61 such as that shown in FIG. 40 is employed, the turnover of the seal 10 can be returned. The seal attaching member 61 is provided with a small-diameter portion 61A. If the small-diameter portion 61A is connected to the end face of the shaft 14, a similar circumferential groove as the case of FIG. 30 will be formed This circumferential groove can return the turnover of the seal 10. The protrusion quantity w3 of the small-diameter portion 61A is greater than the lip height w2 of the lip 10A, and the outer diameter d6 of the small-diameter portion 61A is less than the inner diameter d2 of the lip 10A. The small-diameter portion 61A can be provided not only in the point end portion of the seal attaching member 61 but also in the longitudinal intermediate portion.

While the present invention has been described with reference to preferred embodiments thereof, the invention is not to be limited to the details given herein, but may be modified within the scope of the appended claims.

What is claimed is:

1. A method for judging whether or not a front end of an insertion member has been deformed when said insertion member is inserted onto a shaft, said method comprising the steps of:
    moving said insertion member to a first position on said shaft;
    moving the insertion member to a second position on the shaft at a first predetermined velocity;
    moving the insertion member back to the first position at a second predetermined velocity;
    moving the insertion member back to the second position at a third predetermined velocity;
    detecting an insertion force of said insertion member based on a relation between the first, second and third predetermined velocities; and
    judging a deformation of said front end, based on a result of the detection, wherein the insertion member includes an opening formed in a substantially same shape as an outer periphery of the shaft and the front end of the insertion member contacts the shaft and comprises a shape of a thin blade continuous in a circumferential direction of the shaft.

2. A method for judging whether or not a front end of an insertion member has been deformed when said insertion member is inserted onto a shaft, [said insertion member including an opening formed in a substantially same shape as an outer periphery of said shaft and contacting to said shaft, said front end, which contacts to said shaft, being in a shape of a thin blade continuous in a circumferential direction of said shaft,] said method comprising the steps of:
    performing once or a plurality of times a first operation in which said insertion member is inserted once onto said shaft at a first predetermined position, a second operation in which said insertion member is pulled out from said first predetermined position to a second predetermined position at which said insertion member does not slip out of said shaft, and a third operation in which said insertion member is again inserted on said shaft from said second predetermined position;
    detecting an insertion force applied during said first operation; and
    judging a deformation of said front end, based on a result of the detection,
    wherein the insertion member includes an opening formed in a substantially same shape as an outer periphery of the shaft, and the front end of the insertion member contacts the shaft and comprises a shape of a thin blade continuous in a circumferential direction of the shaft.

3. A method for judging whether or not a front end of an insertion member has been deformed when said insertion member is inserted into a shaft, [said insertion member including an opening formed in a substantially same shape as an outer periphery of said shaft and contacting to said shaft, and said front end, which contacts to said shaft, being in a shape of a thin blade continuous in a circumferential direction of said shaft,] said method comprising the steps of:
    performing once or a plurality of times a first operation in which said insertion member is inserted once onto said shaft at a first predetermined position, a second operation in which said insertion member is pulled out from said first predetermined position to a second predetermined position at which said insertion member does not slip out of said shaft, and a third operation in which said insertion member is again inserted on said shaft from said second predetermined position;
    detecting a pull-out force applied during said second operation; and
    judging a deformation of said front end, based on a result of the detection, wherein the insertion member includes an opening formed in a substantially same shape as an outer periphery of the shaft, and the front end of the insertion member contacts the shaft and comprises a shape of a thin blade continuous in a circumferential direction of the shaft.

4. A method for judging whether or not a front end of an insertion member has been deformed when said insertion member is inserted onto a shaft, [said insertion member including an opening formed in a substantially same shape as an outer periphery of said shaft and contacting to said shaft, and said front end, which contacts to said shaft, being in a shape of a thin blade continuous in a circumferential direction of said shaft,] said method comprising the steps of:
    performing once or a plurality of times a first operation in which said insertion member is inserted once onto said shaft at a first predetermined position, a second operation in which said insertion member is pulled out from said first predetermined position to a second predetermined position at which said insertion member does not slip out of said shaft, and a third operation in which said insertion member is again inserted on said shaft from said second predetermined position;
    detecting an insertion force applied during said third operation; and
    judging a deformation of said front end, based on a result of the detection,
    wherein the insertion member includes an opening formed in a substantially same shape as an outer periphery of the shaft, and the front end of the insertion member contacts the shaft and comprises a shape of a thin blade continuous in a circumferential direction of the shaft.

5. The method as set forth in claim 1, wherein if a value of the detection result is greater than a predetermined value, it is judged that said front end has been deformed.

6. A method for judging whether or not a front end of an insertion member has been deformed when said insertion member is inserted onto a shaft, said method comprising the steps of:
    performing once or a plurality of times a first operation in which said insertion member is inserted once onto said shaft at a first predetermined position, a second operation in which said insertion member is pulled out from said first predetermined position to a second predetermined position at which said insertion member does not slip out of said shaft, and a third operation in which said insertion member is again inserted on said shaft from said second predetermined position;
    detecting an insertion force applied during said first operation and a pull-out force applied during said second operation;
    computing a ratio between the detected insertion force and the detected pull-out force; and
    judging a deformation of said front end, based on a result of the detection, wherein the insertion member includes an opening formed in a substantially same shape as an outer periphery of the shaft and the front end of the insertion member contacts the shaft and comprises a shape of a thin blade continuous in a circumferential direction of the shaft.

7. A method for judging whether or not a front end of an insertion member has been deformed when said insertion member is inserted onto a shaft, said method comprising the steps of:

performing once or a plurality of times a first operation in which said insertion member is inserted once onto said shaft at a first predetermined position, a second operation in which said insertion member is pulled out from said first predetermined position to a second predetermined position at which said insertion member does not slip out of said shaft, and a third operation in which said insertion member is again inserted on said shaft from said second predetermined position;

detecting an insertion force applied during said first operation and an insertion force applied during said third operation;

computing a ratio between the detected two insertion forces; and judging a deformation of said front end, based on computed ratio, wherein the insertion member includes an opening formed in a substantially same shape as an outer periphery of the shaft and the front end of the insertion member contacts the shaft and comprises a shape of a thin blade continuous in a circumferential direction of the shaft.

8. The method as set forth in claim 6, wherein if a value of said computed ratio is greater than a predetermined value, it is judged that said front end has been deformed.

9. A method for judging whether or not a front end of an insertion member has been deformed when said insertion member is inserted onto a shaft, said method comprising the steps of:

performing once or a plurality of times a first operation in which said insertion member is inserted once onto said shaft at a first predetermined position, a second operation in which said insertion member is pulled out from said first predetermined position to a second predetermined position at which said insertion member does not slip out of said shaft, and a third operation in which said insertion member is again inserted on said shaft from said second predetermined position;

detecting a pull-out force applied during said second operation after a fixed time has elapsed since a start of said second operation; and judging a deformation of said front end, based on a result of the detection, wherein the insertion member includes an opening formed in a substantially same shape as an outer periphery of the shaft and the front end of the insertion member contacts the shaft and comprises a shape of a thin blade continuous in a circumferential direction of the shaft.

10. A method for judging whether or not a front end of an insertion member has been deformed when said insertion member is inserted onto a shaft, said method comprising the steps of:

performing once or a plurality of times a first operation in which said insertion member is inserted once onto said shaft at a first predetermined position, a second operation in which said insertion member is pulled out from said first predetermined position to a second predetermined position at which said insertion member does not slip out of said shaft, and a third operation in which said insertion member is again inserted on said shaft from said second predetermined position;

detecting an insertion force applied during said third operation after a fixed time has elapsed since a start of said third operation; and judging a deformation of said front end, based on a result of the detection, wherein the insertion member includes an opening formed in a substantially same shape as an outer periphery of the shaft, and the front end of the insertion member contacts the shaft and comprises a shape of a thin blade continuous in a circumferential direction of the shaft.

11. The method as set forth in claim 9, wherein if a value of the detection result is greater than a predetermined value, it is judged that said front end has been deformed.

12. A method for judging whether or not a front end of an insertion member has been deformed when said insertion member is inserted onto a shaft, said method comprising the steps of:

performing once or a plurality of times a first operation in which said insertion member is inserted once onto said shaft at a first predetermined position, a second operation in which said insertion member is pulled out from said first predetermined position to a second predetermined position at which said insertion member does not slip out of said shaft, and a third operation in which said insertion member is again inserted on said shaft from said second predetermined position;

detecting an insertion force applied during said first operation after a fixed time has elapsed since a start of said first operation and also detecting a pull-out force applied during said second operation after a fixed time has elapsed since a start of said second operation;

computing a ratio between the detected insertion force and the detected pull-out force; and judging a deformation of said front end, based on a result of the computation, wherein the insertion member includes an opening formed in a substantially same shape as an outer periphery of the shaft and the front end of the insertion member contacts the shaft and comprises a shape of a thin blade continuous in a circumferential direction of the shaft.

13. A method for judging whether or not a front end of an insertion member has been deformed when said insertion member is inserted onto a shaft, said method comprising the steps of:

performing once or a plurality of times a first operation in which said insertion member is inserted once onto said shaft at a first predetermined position, a second operation in which said insertion member is pulled out from said first predetermined position to a second predetermined position at which said insertion member does not slip out of said shaft, and a third operation in which said insertion member is again inserted on said shaft from said second predetermined position;

detecting an insertion force applied during said first operation after a fixed time has elapsed since a start of said first operation and also detecting an insertion force applied during said third operation after a fixed time has elapsed since a start of said third operation;

computing a ratio between the detected two insertion forces; and judging a deformation of said front end, based on a result of the computation, wherein the insertion member includes an opening formed in a substantially same shape as an outer periphery of the shaft, and the front end of the insertion member contacts the shaft and comprises a shape of a thin blade continuous in a circumferential direction of the shaft.

14. The method as set forth in claim 12, wherein if a value of said computed ratio is less than a predetermined value, it is judged that said front end has been deformed.

15. A method for judging whether or not a front end of an insertion member has been deformed when said insertion member is inserted onto a shaft, said method comprising the steps of:

performing once or a plurality of times a first operation in which said insertion member is inserted once onto said shaft at a first predetermined position, a second operation in which said insertion member is pulled out from said first predetermined position to a second predetermined position at which said insertion member does not slip out of said shaft, and a third operation in which said insertion member is again inserted on said shaft from said second predetermined position;

detecting an insertion force applied during said first operation over a predetermined time after a fixed time has elapsed since a start of said first operation;

computing an average value of results of the detection; and judging a deformation of said front end, based on said average value, wherein the insertion member includes an opening formed in a substantially same shape as an outer periphery of the shaft, and the front end of the insertion member contacts the shaft and comprises a shape of a thin blade continuous in a circumferential direction of the shaft.

16. A method for judging whether or not a front end of an insertion member has been deformed or not when said insertion member is inserted onto a shaft, said method comprising the steps of:

performing once or a plurality of times a first operation in which said insertion member is inserted once onto said shaft at a first predetermined position, a second operation in which said insertion member is pulled out from said first predetermined position to a second predetermined position at which said insertion member does not slip out of said shaft, and a third operation in which said insertion member is again inserted on said shaft from said second predetermined position;

detecting a pull-out force applied during said second operation over a predetermined time after a fixed time has elapsed since a start of said second operation;

computing an average value of results of the detection; and judging a deformation of said front end, based on said average value, wherein the insertion member includes an opening formed in a substantially same shape as an outer periphery of the shaft, and the front end of the insertion member contacts the shaft and comprises a shape of a thin blade continuous in a circumferential direction of the shaft.

17. A method for judging whether or not a front end of an insertion member has been deformed or not when said insertion member is inserted onto a shaft, said method comprising the steps of:

performing once or a plurality of times a first operation in which said insertion member is inserted once onto said shaft at a first predetermined position, a second operation in which said insertion member is pulled out from said first predetermined position to a second predetermined position at which said insertion member does not slip out of said shaft, and a third operation in which said insertion member is again inserted on said shaft from said second predetermined position;

detecting an insertion force applied during said third operation over a predetermined time after a fixed time has elapsed since a start of said third operation;

computing an average value of results of the detection; and judging a deformation of said front end, based on said average value, wherein the insertion member includes an opening formed in a substantially same shape as an outer periphery of the shaft, and the front end of the insertion member contacts the shaft and comprises a shape of a thin blade continuous in a circumferential direction of the shaft.

18. The method as set forth in claim 15, wherein if the computed average value is greater than a predetermined value, it is judged that said front end has been deformed.

19. A method for judging whether or not a front end of an insertion member has been deformed when said insertion member is inserted onto a shaft, comprising the steps of:

performing once or a plurality of times a first operation in which said insertion member is inserted once onto said shaft at a first predetermined position, a second operation in which said insertion member is pulled out from said first predetermined position to a second predetermined position at which said insertion member does not slip out of said shaft, and a third operation in which said insertion member is again inserted on said shaft from said second predetermined position;

detecting an insertion force applied during said first operation over a predetermined time after a fixed time has elapsed since a start of said first operation and also computing an average value of results of the detection;

detecting a pull-out force applied during said second operation over a predetermined time after a fixed time has elapsed since a start of said second operation and also computing an average value of results of the detection;

computing a ratio between the detected two average values; and judging a deformation of said front end, based on a result of the result of the computation, wherein the insertion member includes an opening formed in a substantially same shape as an outer periphery of the shaft, and the front end of the insertion member contacts the shaft and comprises a shape of a thin blade continuous in a circumferential direction of the shaft.

20. A method for judging whether or not a front end of an insertion member has been deformed when said insertion member is inserted onto a shaft, said method comprising the steps of:

performing once or a plurality of times a first operation in which said insertion member is inserted once onto said shaft at a first predetermined position, a second operation in which said insertion member is pulled out from said first predetermined position to a second predetermined position at which said insertion member does not slip out of said shaft, and a third operation in which said insertion member is again inserted on said shaft from said second predetermined position;

detecting an insertion force applied during said first operation over a predetermined time after a fixed time has elapsed since a start of said first operation and also computing an average value of results of the detection;

detecting an insertion force applied during said third operation over a predetermined time after a fixed time has elapsed since a start of said third operation and also computing an average value of results of the detection;

computing a ratio between the detected two average values; and judging a deformation of said front end, based on a result of the computation, wherein the insertion member includes an opening formed in a substantially same shape as an outer periphery of the shaft, and the front end of the insertion member contacts the shaft and comprises a shape of a thin blade continuous in a circumferential direction of the shaft.

21. The method as set forth in claims 19, wherein if a value of the computed ratio is less than a predetermined value, it is judged that said front end has been deformed.

22. A method for judging whether or not a front end of an insertion member has been deformed when said insertion member is inserted onto a shaft, said method comprising the steps of:

performing once or a plurality of times a first operation in which said insertion member is inserted once onto said shaft at a first predetermined position, a second operation in which said insertion member is pulled out from said first predetermined position to a second predetermined position at which said insertion member does not slip out of said shaft, and a third operation in which said insertion member is again inserted on said shaft from said second predetermined position;

sequentially measuring an insertion force applied during said first operation to detect an insertion force waveform;

estimating a relative position between said shaft and said insertion member from a characteristic of the detected insertion force waveform;

detecting an insertion force at an estimated position; and judging a deformation of said front end, based on a result of the detection, wherein the insertion member includes an opening formed in a substantially same shape as an outer periphery of the shaft, and the front end of the insertion member contacts the shaft and comprises a shape of a thin blade continuous in a circumferential direction of the shaft.

23. The method as set forth in claim 22, wherein if a value of the detection result is greater than a predetermined value, it is judged that said front end has been deformed.

24. The method as set forth in claim 22, wherein the insertion force at the estimated position is used in a preliminary judgement of whether or not the deformation judgement of said front end is possible.

25. A method for judging whether or not a front end of an insertion member has been deformed when said insertion member is inserted onto a shaft, said method comprising the steps of:

inserting said insertion member onto said shaft, while relatively rotating said insertion member and said shaft;

detecting an insertion force when said insertion member is inserted; and judging a deformation of said front end, based on a result of the detection, wherein the detection of said insertion force is performed a plurality of times in a predetermined range of said shaft, when said insertion member is inserted, and an average value of the detection results is used to judge the deformation of said front end, wherein the insertion member includes an opening formed in a substantially same shape as an outer periphery of the shaft, and the front end of the insertion member contacts the shaft and comprises a shape of a thin blade continuous in a circumferential direction of the shaft.

26. The method as set forth in claim 25, wherein if a value of the detection result is greater than a predetermined value, it is judged that said front and has been deformed.

27. An apparatus which inserts an insertion member onto a shaft while relatively rotating said insertion member and said shaft, the apparatus comprising:

detection means for detecting an insertion force when said insertion member is inserted; and judgement means for judging a deformation of a front end of said insertion member, based on a result of the detection, wherein said detection means detects said insertion force a plurality of times in a predetermined range of said shaft when said insertion member is inserted, and an average value of data of a plurality of insertion forces detected by said detection means is employed in a judgement of deformation by said judgement means, wherein the insertion member includes an opening formed in a substantially same shape as an outer periphery of the shaft, and the front end of the insertion member contacts the shaft and comprises a shape of a thin blade continuous in a circumferential direction of the shaft.

28. The method as set forth in claim 25, wherein in a no-load state in which means for inserting said insertion member onto said shaft while relatively rotating said insertion member and said shaft does not perform an insertion member inserting operation, no-load force applied to said means is measured, and when detecting insertion force, said no-load free is subtracted from said insertion force.

29. An apparatus which inserts an insertion member onto a shaft by performing once or a plurality of times a first operation in which said insertion member is inserted once onto said shaft at a first predetermined position, a second operation in which said insertion member is pulled out from said first predetermined position to a second predetermined position at which said insertion member does not slip out of said shaft, and a third operation in which said insertion member is again inserted on said shaft from said second predetermined position, the apparatus comprising:

detection means for detecting an insertion force applied during said first operation; and judgement means for judging a deformation of a front end of said insertion member, based on a result of the detection, wherein the insertion member includes an opening formed in a substantially same shape as an outer periphery of the shaft, and the front end of the insertion member contacts the shaft and comprises a shape of a thin blade continuous in a circumferential direction of the shaft.

30. An apparatus which inserts an insertion member onto a shaft by performing once or a plurality of times a first operation in which said insertion member is inserted once onto said shaft at a first predetermined position, a second operation in which said insertion member is pulled out from said first predetermined position to a second predetermined position at which said insertion member does not slip out of said shaft, and a third operation in which said insertion member is again inserted on said shaft from said second predetermined position, the apparatus comprising:

detection means for detecting a pull-out force applied during said second operation; and judgement means for judging a deformation of a front end of said insertion member, based on a result of the detection, wherein the insertion member includes an opening formed in a substantially same shape as an outer periphery of the shaft, and the front end of the insertion member contacts the shaft and comprises a shape of a thin blade continuous in a circumferential direction of the shaft.

31. An apparatus which inserts an insertion member onto a shaft by performing once or a plurality of times a first operation in which said insertion member is inserted once onto said shaft at a first predetermined position, a second operation in which said insertion member is pulled out from said first predetermined position to a second predetermined position at which said insertion member does not slip out of said shaft, and a third operation in which said insertion member is again inserted on said shaft from said second predetermined position, the apparatus comprising:

detection means for detecting an insertion force applied during said first operation; and judgement means for judging a deformation of a front end of said insertion member, based on a result of the detection, wherein the insertion member includes an opening formed in a substantially same shape as an outer periphery of the shaft, and the front end of the insertion member contacts the shaft and comprises a shape of a thin blade continuous in a circumferential direction of the shaft.

32. The apparatus as set forth in claim 29, wherein said judgement means, if a value of the detection result is greater than a predetermined value, judges that said front end has been deformed.

33. An apparatus which inserts an insertion member onto a shaft by performing once or a plurality of times a first operation in which said insertion member is inserted once onto said shaft at a first predetermined position, a second operation in which said insertion member is pulled out from said first predetermined position to a second predetermined position at which said insertion member does not slip out of said shaft, and a third operation in which said insertion member is again inserted on said shaft from said second predetermined position, the apparatus comprising:

detection means for detecting an insertion force applied during said first operation and a pull-out force applied during said second operation;

ratio computation means for computing a ratio between the detected insertion force and the detected pull-out force; and judgement means for judging a deformation of a front end of said insertion member, based on a result of the computation, wherein the insertion member includes an opening formed in a substantially same shape as an outer periphery of the shaft, and the front end of the insertion member contacts the shaft and comprises a shape of a thin blade continuous in a circumferential direction of the shaft.

34. An apparatus which inserts an insertion member onto a shaft by performing once or a plurality of times a first operation in which said insertion member is inserted once onto said shaft at a first predetermined position, a second operation in which said insertion member is pulled out from said first predetermined position to a second predetermined position at which said insertion member does not slip out of said shaft, and a third operation in which said insertion member is again inserted on said shaft from said second predetermined position, the apparatus comprising:

detection means for detecting an insertion force applied during said first operation and an insertion force applied during said third operation;

ratio computation means for computing a ratio between the detected two insertion forces; and judgement means for judging a deformation of a front end of said insertion member, based on a result of the computation, wherein the insertion member includes an opening formed in a substantially same shape as an outer periphery of the shaft, and the front end of the insertion member contacts the shaft and comprises a shape of a thin blade continuous in a circumferential direction of the shaft.

35. The apparatus as set forth in claim 33, wherein said judgement means, if a value of said ratio computed by said ratio computation means is greater than a predetermined value, judges that said front end has been deformed.

36. An apparatus which inserts an insertion member onto a shaft by performing once or a plurality of times a first operation in which said insertion member is inserted once onto said shaft at a first predetermined position, a second operation in which said insertion member is pulled out from said first predetermined position to a second predetermined position at which said insertion member does not slip out of said shaft, and a third operation in which said insertion member is again inserted on said shaft from said second predetermined position, the apparatus comprising:

detection means for detecting a pull-out force applied during said second operation after a fixed time has elapsed since a start of said second operation; and judgement means for judging a deformation of a front end of said insertion member, based on a result of the detection, wherein the insertion member includes an opening formed in a substantially same shape as an outer periphery of the shaft, and the front end of the insertion member contacts the shaft and comprises a shape of a thin blade continuous in a circumferential direction of the shaft.

37. An apparatus which inserts an insertion member onto a shaft by performing once or a plurality of times a first operation in which said insertion member is inserted once onto said shaft at a first predetermined position, a second operation in which said insertion member is pulled out from said first predetermined position to a second predetermined position at which said insertion member does not slip out of said shaft, and a third operation in which said insertion member is again inserted on said shaft from said second predetermined position, the apparatus comprising:

detection means for detecting an insertion force applied during said third operation after a fixed time has elapsed since a start of said third operation; and judgement means for judging a deformation of a front end of said insertion member, based on a result of the detection, wherein the insertion member includes an opening formed in a substantially same shape as an outer periphery of the shaft, and the front end of the insertion member contacts the shaft and comprises a shape of a thin blade continuous in a circumferential direction of the shaft.

38. The apparatus as set forth in claim 36, wherein said judgement means, if a value of the detection result is greater than a predetermined value, judges that said front end has been deformed.

39. An apparatus which inserts an insertion member onto a shaft by performing once or a plurality of times a first operation in which said insertion member is inserted once onto said shaft at a first predetermined position, a second operation in which said insertion member is pulled out from said first predetermined position to a second predetermined position at which said insertion member does not slip out of said shaft, and a third operation in which said insertion member is again inserted on said shaft from said second predetermined position, the apparatus comprising:

detection means for detecting an insertion force applied during said first operation after a fixed time has elapsed since a start of said first operation and also detecting a pull-out force applied during said second operation after a fixed time has elapsed since a start of said second operation;

ratio computation means for computing a ratio between the detected insertion force and the detected pull-out force; and judgement means for judging a deformation of a front end of said insertion member, based on a result of the computation, wherein the insertion member includes an opening formed in a substantially same shape as an outer periphery of the shaft, and the front end of the insertion member contacts the shaft and comprises a shape of a thin blade continuous in a circumferential direction of the shaft.

40. An apparatus which inserts an insertion member onto a shaft by performing once or a plurality of times a first operation in which said insertion member is inserted once onto said shaft at a first predetermined position, a second operation in which said insertion member is pulled out from said first predetermined position to a second predetermined position at which said insertion member does not slip out of said shaft, and a third operation in which said insertion member is again inserted on said shaft from said second predetermined position, the apparatus comprising:

detection means for detecting an insertion force applied during said first operation after a fixed time has elapsed since a start of said first operation and also detecting an insertion force applied during said third operation after a fixed time has elapsed since a start of said third operation;

ratio computation means for computing a ratio between the detected two insertion forces; and judgement means for judging a deformation of a front end of said insertion member, based on a result of the computation, wherein the insertion member includes an opening formed in a substantially same shape as an outer periphery of the shaft, and the front end of the insertion member contacts the shaft and comprises a shape of a thin blade continuous in a circumferential direction of the shaft.

41. The apparatus as set forth in claim 39, wherein said judgement means, if a value of said ratio computed by said ratio computation means is greater than a predetermined value, judges that said front end has been deformed.

42. An apparatus which inserts an insertion member onto a shaft by performing once or a plurality of times a first operation in which said insertion member is inserted once onto said shaft at a first predetermined position, a second operation in which said insertion member is pulled out from said first predetermined position to a second predetermined position at which said insertion member does not slip out of said shaft, and a third operation in which said insertion member is again inserted on said shaft from said second predetermined position, the apparatus comprising:

detection means for detecting an insertion force applied during said first operation over a predetermined time after a fixed time has elapsed since a start of said first operation;

average value computation means for computing an average value of results of the detection; and judgement means for judging a deformation of a front end of said insertion member, based on said average value, wherein the insertion member includes an opening formed in a substantially same shape as an outer periphery of the shaft, and the front end of the insertion member contacts the shaft and comprises a shape of a thin blade continuous in a circumferential direction of the shaft.

43. An apparatus which inserts an insertion member onto a shaft by performing once or a plurality of times a first operation in which said insertion member is inserted once onto said shaft at a first predetermined position, a second operation in which said insertion member is pulled out from said first predetermined position to a second predetermined position at which said insertion member does not slip out of said shaft, and a third operation in which said insertion member is again inserted on said shaft from said second predetermined position, the apparatus comprising:

detection means for detecting a pull-out force applied during said second operation over a predetermined time after a fixed time has elapsed since a start of said second operation;

average value computation means for computing an average value of results of the detection; and judgement means for judging a deformation of a front end of said insertion member, based on said average value, wherein the insertion member includes an opening formed in a substantially same shape as an outer periphery of the shaft, and the front end of the insertion member contacts the shaft and comprises a shape of a thin blade continuous in a circumferential direction of the shaft.

44. An apparatus which inserts an insertion member onto a shaft by performing once or a plurality of times a first operation in which said insertion member is inserted once onto said shaft at a first predetermined position, a second operation in which said insertion member is pulled out from said first predetermined position to a second predetermined position at which said insertion member does not slip out of said shaft, and a third operation in which said insertion member is again inserted on said shaft from said second predetermined position, the apparatus comprising:

detection means for detecting an insertion force applied during said third operation over a predetermined time after a fixed time has elapsed since a start of said third operation;

average value computation means for computing an average value of results of the detection; and judgement means for judging a deformation of a front end of said insertion member, based on said average value, wherein the insertion member includes an opening formed in a substantially same shape as an outer periphery of the shaft, and the front end of the insertion member contacts the shaft and comprises a shape of a thin blade continuous in a circumferential direction of the shaft.

45. The apparatus as set forth in claim 42, wherein said judgement means, if the computed average value is greater than a predetermined value, judges that said front end has been deformed.

46. An apparatus which inserts an insertion member onto a shaft by performing once or a plurality of times a first operation in which said insertion member is inserted once onto said shaft at a first predetermined position, a second operation in which said insertion member is pulled out from said first predetermined position to a second predetermined position at which said insertion member does not slip out of said shaft, and a third operation in which said insertion member is again inserted on said shaft from said second predetermined position, the apparatus comprising:

detection means for detecting an insertion force applied during said first operation over a predetermined time after a fixed time has elapsed since a start of said first operation and also detecting a pull-out force applied during said second operation over a predetermined time after a fixed time has elapsed since a start of said second operation;

average value computation means for computing an average value of results of the detection performed during said first operation and also computing an average value of results of the detection performed during said second operation;

ratio computation means for computing a ratio between the detected two average values; and judgement means for judging a deformation of a front end of said insertion member, based on the computed ratio, wherein the insertion member includes an opening formed in a substantially same shape as an outer periphery of the shaft, and the front end of the insertion member contacts the shaft and comprises a shape of a thin blade continuous in a circumferential direction of the shaft.

47. An apparatus which inserts an insertion member onto a shaft by performing once or a plurality of times a first operation in which said insertion member is inserted once onto said shaft at a first predetermined position, a second operation in which said insertion member is pulled out from said first predetermined position to a second predetermined position at which said insertion member does not slip out of said shaft, and a third operation in which said insertion member is again inserted on said shaft from said second predetermined position, the apparatus comprising:

detection means for detecting an insertion force applied during said first operation over a predetermined time after a fixed time has elapsed since a start of said first operation and also detecting an insertion force applied during said third operation over a predetermined time after a fixed time has elapsed since a start of said third operation;

average value computation means for computing an average value of results of the detection performed during said first operation and also computing an average value of results of the detection performed during said third operation;

ratio computation means for computing a ratio between the detected two average values; and judgement means for judging a deformation of a front end of said insertion member, based on the computed ratio, wherein the insertion member includes an opening formed in a substantially same shape as an outer periphery of the shaft, and the front end of the insertion member contacts the shaft and comprises a shape of a thin blade continuous in a circumferential direction of the shaft.

48. The apparatus as set forth in claim 46, wherein said judgement means, if a value of the computed ratio is less than a predetermined value, judges that said front end has been determined.

49. An apparatus which inserts an insertion member onto a shaft by performing once or a plurality of times a first operation in which said insertion member is inserted once onto said shaft at a first predetermined position, a second operation in which said insertion member is pulled out from said first predetermined position to a second predetermined position at which said insertion member does not slip out of said shaft, and a third operation in which said insertion member is again inserted on said shaft from said second predetermined position, the apparatus comprising:

means for sequentially measuring an insertion force applied during said first operation to detect an insertion force waveform;

detection means for estimating a relative position between said shaft and said insertion member from a characteristic of the detected insertion force waveform and detecting an insertion force at an estimated position; and judgement means for judging a deformation of a front end of said insertion member, based on a result of the detection, wherein the insertion member includes an opening formed in a substantially same shape as an outer periphery of the shaft, and the front end of the insertion member contacts the shaft and comprises a shape of a thin blade continuous in a circumferential direction of the shaft.

50. The apparatus as set forth in claim 49, wherein said judgement means, if a value of the detection result is greater than a predetermined value, judged that said front end has been deformed.

51. The apparatus as set forth in claim 49, wherein the insertion force at said estimated position is used by said judgment means in a preliminary judgement of whether or not deformation judgement of said front end is possible.

52. An apparatus for inserting a insertion member onto a shaft, comprising:

a chuck for directly or indirectly clamping said insertion member;

detection means for detecting an insertion force when said insertion member clamped by said chuck is inserted onto said shaft; and judgement means for judging a deformation of a front end of said insertion member, based on a result of the detection, wherein said detection means detects said insertion force a plurality of times in a predetermined range of said shaft when said insertion member is inserted, and an average value of data of a plurality of insertion forces detected by said detection means is employed in a judgement of deformation by said judgement means, wherein the insertion member includes an opening formed in a substantially same shape as an outer periphery of the shaft, and the front end of the insertion member contacts the shaft and comprises a shape of a thin blade continuous in a circumferential direction of the shaft.

53. An apparatus for inserting an insertion member onto a shaft, comprising:

a chuck for directly or indirectly clamping said insertion member;

detection means for detecting an insertion force when said insertion member clamped by said chuck is inserted onto said shaft, for detecting a pull-out force when said insertion member is pulled out to a position at which said insertion member does not slip out of said shaft, and for detecting an insertion force when said insertion member clamped by said chuck is again inserted onto said shaft; and judgement means for judging a deformation of a front end of said insertion member, based on a result of the detection, wherein said detection means detects said insertion force a plurality of times in a predetermined range of said shaft when said insertion member is inserted, and an average value of data of a plurality of insertion forces detected by said detection means is employed in a judgement of deformation by said judgement means, wherein the insertion member includes an opening formed in a substantially same shape as an outer periphery of the shaft and the front end of the insertion member contacts the shaft and comprises a shape of a thin blade continuous in a circumferential direction of the shaft.

54. The apparatus as set forth in claim 52, wherein said chuck is attached to a holding means which holds said chuck so that said chuck is freely slidable along an insertion direction of said insertion member, and said holding means is urged in the insertion direction of said insertion member in a no-load state in which said insertion member is not inserted on said shaft.

55. The apparatus as set forth in claim 47, wherein said judgement means, if a value of the computed ratio is less than a predetermined value, judges that said front end has been deformed.

56. The apparatus as set forth in claim 55, wherein said judgement means, if a value of the detection result is greater than a predetermined value, judges that said front end has been deformed.

57. The apparatus as set forth in claim 53, wherein said chuck is attached to a holding means which holds said chuck so that said chuck is freely slidable along an insertion direction of said insertion member, and said holding means is urged in the insertion direction of said insertion member in a no-load state in which said insertion member is not inserted on said shaft.

58. The method as set forth in claim 2, wherein if a value of the detection result is greater than a predetermined value, it is judged that said front end has been deformed.

59. The method as set forth in claim 3, wherein if a value of the detection result is greater than a predetermined value, it is judged that said front end has been deformed.

60. The method as set forth in claim 4, wherein if a value of the detection result is greater than a predetermined value, it is judged that said front end has been deformed.

61. The method as set forth in claim 7, wherein if a value of said computed ratio is greater than a predetermined value, it is judged that said front end has been deformed.

62. The method as set forth in claim 10, wherein if a value of the detection result is greater than a predetermined value, it is judged that said front end has been deformed.

63. The method as set forth in claim 13, wherein if a value of said computed ratio is less than a predetermined value, it is judged that said front end has been deformed.

64. The method as set forth in claim 16, wherein if the computed average value is greater than a predetermined value, it is judged that said front end has been deformed.

65. The method as set forth in claim 17, wherein if the computed average value is greater than a predetermined value, it is judged that said front end has been deformed.

66. The method as set forth in claim 20, wherein if a value of the computed ratio is less than a predetermined value, it is judged that said front end has been deformed.

67. The apparatus as set forth in claim 30, wherein said judgement means, if a value of the detection result is greater than a predetermined value, judges that said front end has been deformed.

68. The apparatus as set forth in claim 31, wherein said judgement means, if a value of the detection result is greater than a predetermined value, judges that said front end has been deformed.

69. The apparatus as set forth in claim 34, wherein said judgement means, if a value of said ratio computed by said ratio computation means is greater than a predetermined value, judges that said front end has been deformed.

70. The apparatus as set forth in claim 37, wherein said judgement means, if a value of the detection result is greater than a predetermined value, judges that said front end has been deformed.

71. The apparatus as set forth in claim 40, wherein said judgement means, if a value of said ratio computed by said ratio computation means is greater than a predetermined value, judges that said front end has been deformed.

72. The apparatus as set forth in claim 43, wherein said judgement means, if the computed average value is greater than a predetermined value, judges that said front end has been deformed.

73. The apparatus as set forth in claim 44, wherein said judgement means, if the computed average value is greater than a predetermined value judges that said front end has been deformed.

* * * * *